(12) United States Patent
Pons et al.

(10) Patent No.: US 10,472,948 B2
(45) Date of Patent: Nov. 12, 2019

(54) DIAGNOSTICS OF DOWNHOLE DYNAMOMETER DATA FOR CONTROL AND TROUBLESHOOTING OF RECIPROCATING ROD LIFT SYSTEMS

(71) Applicant: Weatherford Technology Holdings, LLC, Houston, TX (US)

(72) Inventors: Victoria M. Pons, Katy, TX (US); Anthony P. Allison, Kingwood, TX (US); Jeremy M. Gomes, Houston, TX (US)

(73) Assignee: WEATHERFORD TEHNOLOGY HOLDINGS, LLC, Houston, TX (US)

( * ) Notice: Subject to any disclaimer, the term of this patent is extended or adjusted under 35 U.S.C. 154(b) by 453 days.

(21) Appl. No.: 15/210,319

(22) Filed: Jul. 14, 2016

(65) Prior Publication Data
US 2017/0016313 A1    Jan. 19, 2017

Related U.S. Application Data

(60) Provisional application No. 62/193,060, filed on Jul. 15, 2015.

(51) Int. Cl.
*E21B 47/00* (2012.01)
*E21B 43/12* (2006.01)
(Continued)

(52) U.S. Cl.
CPC ........ *E21B 47/0007* (2013.01); *E21B 43/127* (2013.01); *E21B 47/0008* (2013.01);
(Continued)

(58) Field of Classification Search
CPC ............... E21B 43/127; E21B 47/0008; E21B 47/0007–0008; E21B 43/12;
(Continued)

(56) References Cited

U.S. PATENT DOCUMENTS 5,464,058 A  * 11/1995 McCoy ............... E21B 47/0008
166/250.01
8,322,995 B2  12/2012 Ehimeakhe
(Continued)

FOREIGN PATENT DOCUMENTS

CA        2856090 A1     5/2013

OTHER PUBLICATIONS

Ehimeakhe, Victoria. "Pump Fillage Calculation (PFC) Algorithm for Well Control." 6th Annual Sucker Rod Pumping Workshop, . Sep. 14, 2010, Dallas, Texas, Wyndham Hotel.. (Year: 2010).*
(Continued)

*Primary Examiner* — Jarrett J Stark
(74) *Attorney, Agent, or Firm* — Patterson + Sheridan, LLP

(57) ABSTRACT

Techniques and apparatus are provided for improved diagnostics of downhole dynamometer data for control and troubleshooting of reciprocating rod lift systems. A method for pump fillage determination for a reciprocating rod lift system is provided. The method generally includes measuring downhole data during a pump cycle, wherein the downhole data comprises a first plurality of data points associated with an upstroke of the pump cycle and a second plurality of data points associated with a downstroke of the pump cycle, each data point comprising a rod position value and an associated rod load value; converting the data points to non-dimensional data points, calculating non-dimensional slope values between non-dimensional data points; and determining pump fillage based, at least part, on the calculated non-dimensional slope values.

22 Claims, 24 Drawing Sheets

(51) Int. Cl.
　　　*F04B 47/02*　　　(2006.01)
　　　*F04B 49/06*　　　(2006.01)
　　　*F04B 49/22*　　　(2006.01)
　　　*G05B 19/042*　　(2006.01)
　　　*G05D 7/06*　　　(2006.01)

(52) U.S. Cl.
　　　CPC .......... *F04B 47/022* (2013.01); *F04B 49/065* (2013.01); *F04B 49/22* (2013.01); *G05B 19/042* (2013.01); *G05D 7/0676* (2013.01); *F04B 2201/0201* (2013.01); *F04B 2201/0601* (2013.01); *F04B 2201/121* (2013.01); *G05B 2219/43193* (2013.01)

(58) Field of Classification Search
　　　CPC .......... E21B 43/121; E21B 43/124–128; F04B 49/22; F04B 49/065; F04B 47/022; F04B 2201/0691; F04B 2201/121; F04B 2201/0201; G05B 19/042; G05B 2219/43193; G05D 7/0676
　　　See application file for complete search history.

(56) References Cited

U.S. PATENT DOCUMENTS

| | | | |
|---|---|---|---|
| 8,328,527 B2 | 12/2012 | Ehimeakhe | |
| 10,197,050 B2* | 2/2019 | Robison | ............... E21B 43/126 |
| 2002/0007952 A1* | 1/2002 | Vann | ..................... E21B 43/126 |
| | | | 166/369 |
| 2006/0289168 A1* | 12/2006 | Davila | ............... E21B 47/0008 |
| | | | 166/369 |
| 2011/0091332 A1* | 4/2011 | Ehimeakhe | ........... E21B 43/127 |
| | | | 417/53 |
| 2011/0097214 A1* | 4/2011 | Wentworth | ............. F04B 49/06 |
| | | | 417/44.1 |
| 2012/0298375 A1* | 11/2012 | Krauss | ............... E21B 47/0008 |
| | | | 166/369 |
| 2014/0088875 A1* | 3/2014 | Krauss | .................. E21B 43/127 |
| | | | 702/6 |
| 2014/0343743 A1* | 11/2014 | DaCunha | .................. G06F 1/28 |
| | | | 700/291 |
| 2015/0345280 A1* | 12/2015 | Krauss | .................. E21B 43/127 |
| | | | 700/282 |
| 2015/0377006 A1 | 12/2015 | Pons | |
| 2016/0245276 A1 | 8/2016 | Robison et al. | |
| 2018/0128264 A1* | 5/2018 | Robison | ................ E21B 43/127 |
| 2019/0012492 A1* | 1/2019 | Pons | ........................ G06G 7/66 |

OTHER PUBLICATIONS

Ehimeakhe, V. "Calculating Pump Fillage for Well Control using Transfer Point Location," SPE Eastern Regional Meeting, Oct. 12-14, 2010, Morgantown, West Virginia, USA.

CA Examination Search Report dated May 29, 2017 for CA 2,936,398.

* cited by examiner

| INDEX | POSITION SPANS | LOAD SPANS | LEFT | TOP | RIGHT | BOTTOM |
|---|---|---|---|---|---|---|
| 1 | 10 | 9 | -53 | 0 | 59 | 0 |
| 2 | 10 | 9 | 39 | -1 | ∞ | 0 |
| 3 | 10 | 9 | 54 | 0 | 79 | 0 |
| 4 | 10 | 9 | 30 | 0 | 76 | 0 |
| 5 | 10 | 9 | ∞ | 0 | ∞ | 0 |
| 6 | 10 | 9 | 22 | 0 | 51 | 0 |
| 7 | 10 | 9 | 21 | 0 | 63 | 0 |
| 8 | 10 | 9 | 18 | 0 | -497 | 0 |
| 9 | 10 | 9 | 14 | 0 | -50 | 0 |
| 10 | 10 | 9 | 10 | 0 | -112 | -1 |
| 11 | 10 | 9 | | | | |

# DIAGNOSTICS OF DOWNHOLE DYNAMOMETER DATA FOR CONTROL AND TROUBLESHOOTING OF RECIPROCATING ROD LIFT SYSTEMS

CROSS-REFERENCE TO RELATED APPLICATIONS

This application claims benefit of U.S. Provisional Patent Application Ser. No. 62/193,060, filed Jul. 15, 2016, which is herein incorporated by reference

BACKGROUND

Field of the Disclosure

Aspects of the present disclosure generally relate to hydrocarbon production using artificial lift and estimating efficiency and controlling the operation of a downhole pump disposed in a wellbore. More particularly, techniques of the present disclosure generally relate to improved diagnostics of downhole dynamometer data for control and troubleshooting of reciprocating rod lift systems.

Description of the Related Art

To obtain production fluids (e.g., hydrocarbons, oil, water, gas, and mixtures thereof), a wellbore is drilled into the earth to intersect a productive formation. Upon reaching the productive formation, pumps can be used in wells to help bring production fluids from the productive formation to a wellhead located at the surface. This is often referred to as providing artificial lift, as the reservoir pressure may be insufficient for the production fluid to reach the surface on its own (i.e., natural lift).

The production of fluids with a sucker-rod pump is common practice in the oil and gas industry. An oil well generally comprises a casing, a string of smaller steel pipe inside the casing and generally known as the tubing, a pump at the bottom of the well, and a string of steel rod elements, commonly referred to as sucker rods, within the tubing and extending down into the pump for operating the pump. Various devices as are well known in the art are provided at the top of the well for reciprocating the sucker rod to operate the pump.

It is desired to know the quantity of fluid entering the pump on each stroke (the pump "fillage") for a number of purposes including, for example, to stop the pumping system periodically to allow more fluid to enter the wellbore or to control the speed of the pumping system so that it does not pump more fluid than enters the wellbore. Knowing the pump fillage also allows the total amount of fluid produced by the well to be calculated.

Other methods have previously relied on the shape of the graphical representation of the downhole card to compute the pump fillage. For example, U.S. Pat. No. 5,252,031 to Gibbs, entitled "Monitoring and Pump-Off Control with Downhole Pump Cards," teaches a method for monitoring a rod pumped well to detect various pump problems by utilizing measurements made at the surface to generate a downhole pump card.

A surface dynamometer card is the plot of the measured rod loads at the various positions throughout a complete stroke. Each well can have a unique signature for its surface data. A dynamometer survey measures the load forces acting on a rod string during a complete pumping cycle (e.g., a downstroke and an upstroke) and records the forces on a chart or computer display. This display is often called a dynamometer card. The dynamometer card records changes in the rod load versus rod displacement, or changes in the rod load versus pumping time. During a pumping cycle, forces acting on the rod string cause changes in the rod load. Measurements of these rod loads reflect the operation of the subsurface pump and the surface unit. As evident from the graphical representation of the surface data, it may be difficult and/or inefficient to predict the shape, orientation, and span of the surface card.

For example, in a theoretical downhole, the bottom line may represent the plunger stroke and the top line may represent the sucker rod stroke. The bottom left point of the card may correspond to the start of the pump cycle with the standing valve and traveling valve closed. The top left point of the card may correspond to the opening of the standing valve during the upstroke. The top right point of the card may correspond to the closing of the standing valve at the top of stroke (TOS). The bottom right point of the card may correspond to the opening of the traveling valve during the downstroke.

A downhole dynamometer card (e.g., referred to as a pump card) is a plot of the calculated loads at various positions of pump stroke and represents the fluid load the pump applies to the bottom of the rod string. Measured surface data is used to calculate downhole data by solving the one dimensional damped wave equation. The wave equation model uses an iterated downhole friction factor. Friction continuously and irreversibly removed energy from the system. While in the case of the downhole data, the shape, orientation, and span may be more predictable than for the surface card, mechanical friction, fluid friction, and/or coulomb friction (referred to herein simply as "friction") may cause errors or inaccuracies in the computing of the downhole card and should be properly handled in order to control the well efficiently.

The graphically represented downhole pump card may then be used to detect the various pump problems and control the pumping unit. Using downhole data, downhole conditions may be diagnosed such as, for example, pump off, gas interference, upstroke pump wear, and friction etc. In addition, other quantities such as pump fillage, fluid load, valve opening and closing, and net stroke, for example, may be deduced.

Owing to the diversity of card shapes, however, it can be difficult to make a diagnosis of downhole conditions solely on the basis of the shape of the graphical representation. Furthermore, in some instances, such graphical techniques may lead to inaccurate determinations of the pump fillage such that fluid production calculated therefrom may be incorrect. Also, given that a single field engineer may be responsible for thousands of wells at a time, properly diagnosing and controlling each well can be difficult if a visual analysis is required.

Accordingly, techniques and systems that rely less on human interpretation in determining the pump fillage are desirable.

SUMMARY

The systems, methods, and devices of the disclosure each have several aspects, no single one of which is solely responsible for its desirable attributes. Without limiting the scope of this disclosure, some features will now be discussed briefly. After considering this discussion, and particularly after reading the section entitled "Detailed Description," one will understand how the features of this disclosure provide advantages that include improved production for artificially lifted wells.

Aspects of the present disclosure generally relate to hydrocarbon production using artificial lift, and, more particularly, to a technique for improved diagnostics of downhole dynamometer data for control and troubleshooting of reciprocating rod lift systems.

One aspect of the present disclosure is a method for pump fillage determination for a reciprocating rod lift system. The method generally includes measuring downhole data during a pump cycle, wherein the downhole data comprises a first plurality of data points associated with an upstroke of the pump cycle and a second plurality of data points associated with a downstroke of the pump cycle, each data point comprising a rod position value and an associated rod load value; converting the data points to non-dimensional data points; calculating non-dimensional slope values between non-dimensional data points; and determining pump fillage based, at least part, on the calculated non-dimensional slope values.

Another aspect of the present disclosure is a reciprocating rod lift system. The system generally includes a pump comprising: a pump barrel, a plunger; a standing valve, and a traveling valve; and a control unit for controlling the pump, wherein the control unit is configured to: measure downhole data during a pump cycle, wherein the downhole data comprises of a first plurality of data points associated with an upstroke of the pump cycle and a second plurality of data points associated with a downstroke of the pump cycle, each data point comprising a rod position value and an associated rod load value, convert the data points to non-dimensional data points, calculate non-dimensional slope values between non-dimensional data points, and determine pump fillage based, at least part, on the calculated non-dimensional slope values.

Yet another aspect of the present disclosure is a computer readable medium having computer executable code stored thereon or pump fillage determination for a reciprocating rod lift system. The computer executable code generally includes code for measuring downhole data during a pump cycle, wherein the downhole data comprises a first plurality of data points associated with an upstroke of the pump cycle and a second plurality of data points associated with a downstroke of the pump cycle, each data point comprising a rod position value and an associated rod load value; code for converting the data points to non-dimensional data points; code for calculating non-dimensional slope values between non-dimensional data points; and code for determining pump fillage based, at least part, on the calculated non-dimensional slope values.

Numerous other aspects are provided including methods, apparatus, systems, computer program products, and processing systems.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. The detailed description and drawings are merely illustrative of the disclosure rather than limiting, the scope of the disclosure being defined by the appended claims and equivalents thereof.

Aspects of the present disclosure provide techniques for improved diagnostics of downhole dynamometer data for control and troubleshooting of reciprocating rod lift systems. This may allow well operators to accurately monitor the pump fillage and control the pump accordingly.

Example Artificial Lift System

Figure 1:
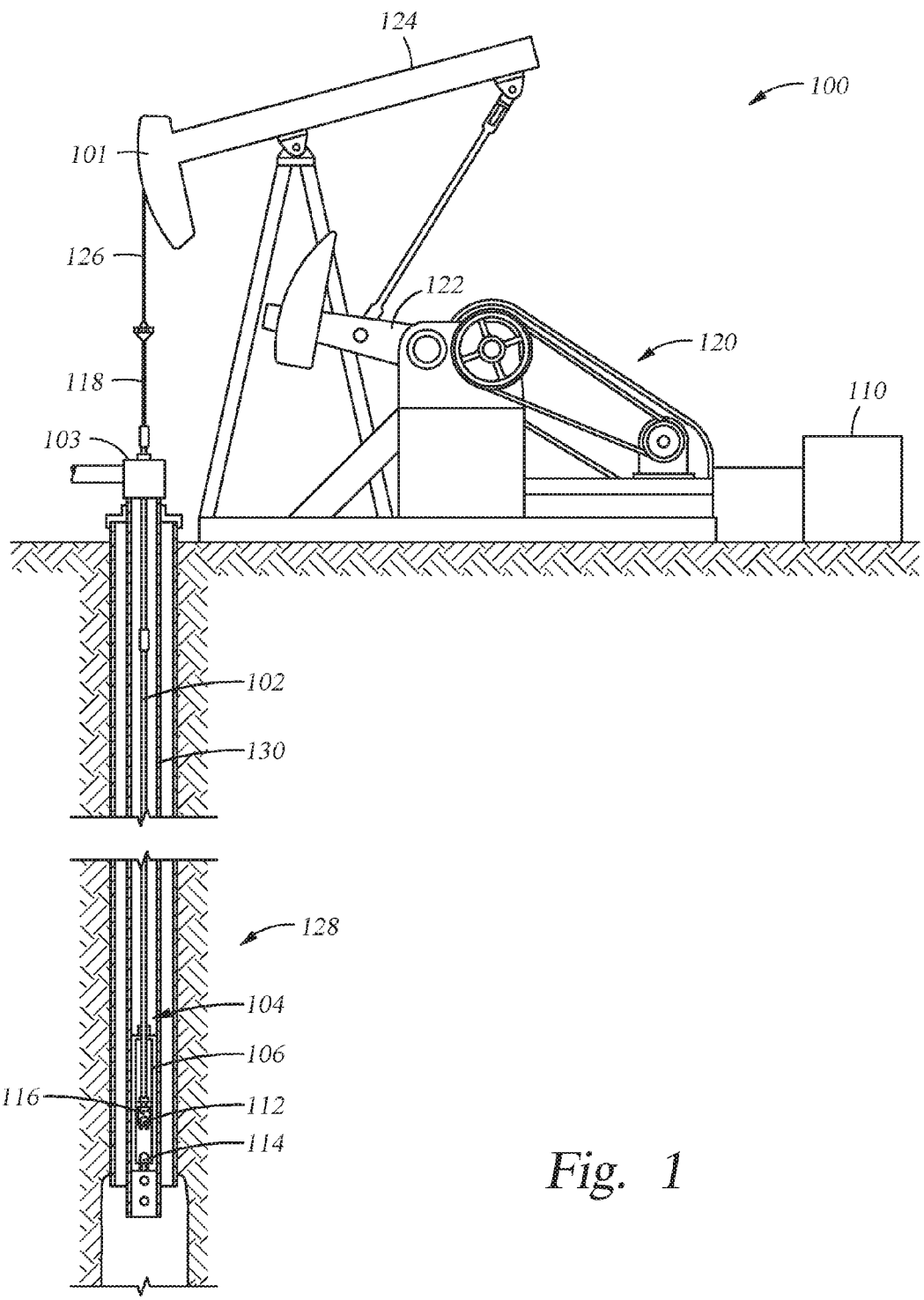
FIG. 1 illustrates a reciprocating rod lift system with a control unit for controlling the pump in an effort to extract fluid from a well, in accordance with certain aspects of the present disclosure.

The production of fluids (e.g., hydrocarbons, oil, gas, water, or a mixture thereof) with a reciprocating rod lift system 100 (e.g., sucker-rod pump system or rod pumping lift system), such as that depicted in FIG. 1, is common practice in the oil and gas industry.

FIG. 1 illustrates a reciprocating rod lift system 100 with a control unit 110 (e.g., including a rod pump controller or variable speed drive controller) for controlling the rod pump in an effort to extract fluid from a well, according to certain aspects of the present disclosure. Although shown with a conventional pumping unit in FIG. 1, the reciprocating rod lift system 100 may employ any suitable pumping unit.

The reciprocating rod lift system 100 is driven by a motor or engine 120 that turns a crank arm 122. Attached to the crank arm 122 are a walking beam 124 and a horsehead 101. A cable 126 hangs off the horsehead 101 and is attached to a sucker rod string 118 (e.g., a string of steel rod elements or a continuous rod string). The rod string 118 is attached to a downhole rod pump 104 located within the wellbore 128. In operation, the motor 120 turns the crank arm 122 which reciprocates the walking beam 124 which reciprocates the sucker rod string 118.

In the reciprocating rod lift system 100, the rod pump 104 consists of a pump barrel 106 with a valve 114 (the "standing valve") located at the bottom that allows fluid to enter from the wellbore, but does not allow the fluid to leave. The pump barrel 106 can be attached to or part of the production tubing 130 within the wellbore 128. Inside the pump barrel 106 is a close-fitting hollow plunger 116 with another valve 112 (the "traveling valve") located at the top. This allows fluid to move from below the plunger 116 to the production tubing 130 above and does not allow fluid to return from the tubing 130 to the pump barrel 106 below the plunger 116. The plunger 116 may be moved up and down cyclically by the horsehead 101 at the surface via the polished rod 102, where the motion of the pump plunger 116 comprises an "upstroke" and a "downstroke," jointly referred to as a "stroke." A polished rod 102, which is a portion of the rod string passing through a stuffing box 103 at the surface, may enable an efficient hydraulic seal to be made around the reciprocating rod string. A control unit 110, which may be located at the surface, may control the system 100.

During the part of the pump cycle where the plunger 116 is moving upward (the upstroke), the traveling valve 112 is closed, and any fluid above the plunger 116 in the production tubing 130 may be lifted towards the surface. Meanwhile, the standing valve 114 opens and allows fluid to enter the pump barrel 106 from the wellbore.

The highest point of the pump plunger motion may be referred to as the "top of stroke" or TOS, while the lowest point of the pump plunger motion may be referred to as the "bottom of stroke" or BOS. At the TOS, the weight of the fluid in the production tubing 130 may be supported by the traveling valve 112 in the plunger 116 and, therefore, also by the rod string 118. This load causes the rod 118 to be stretched. At this point, the standing valve 114 closes and holds in the fluid that has entered the pump barrel 106.

Typically, the reciprocating rod lift system 100 is designed with the capacity to remove liquid from the wellbore 128 faster than the reservoir can supply liquid into the wellbore 128. As a result, the downhole pump does not completely fill with fluid on every stroke. The well is said to be "pumped-off" when the pump barrel 106 does not completely fill with fluid on the upstroke of the plunger 116. The term "pump fillage" is used to describe the percentage of the pump stroke which actually contains liquid.

During the part of the pump cycle where the plunger 116 is moving downward (the "downstroke"), the traveling valve 112 initially remains closed until the plunger 116 reaches the surface of the fluid in the barrel. Sufficient pressure may be built up in the fluid below the traveling valve 112 to balance the pressure due to the column of fluid to the surface in the production tubing 130. The build-up of pressure in the pump barrel 106 reduces the load on the rod string 118; this causes the stretching of the rod string 118 that occurred during the upstroke to relax. This process takes place during a finite amount of time when the plunger 116 rests on the fluid and the horsehead 101 at the surface allows the top of the rod string 118 to move downward.

The position of the pump plunger 116 at this time is known as the "transfer point" as the load of the fluid column in the production tubing 130 is transferred from the traveling valve 112 to the standing valve 114. This results in a rapid decrease in load on the rod string 118 during the transfer. After the pressure below the traveling valve 112 balances the one above, the valve 112 opens and the plunger 116 continues to move downward to its lowest position (the BOS). The movement of the plunger 116 from the transfer point to the BOS is known as the "fluid stroke" and is a measure of the amount of fluid lifted by the pump 104 on each stroke. In other words, the portion of the pump stroke below the transfer point may be interpreted as the percentage of the pump stroke containing fluid. This percentage is the pump fillage.

Being a positive displacement pumping system, rod-pump systems (e.g., reciprocating rod lift system 100) can reduce the bottom hole pressure to a "near zero" value. The foremost goal of rod pumping optimization is to match well displacement to inflow, which may be difficult if inflow is unknown or highly uncertain. Uncertainty related to inflow may lead to an overly conservative approach; for example, where the system is designed or operated such that the pump displacement is lower than the inflow, such as by continuous pumping. In this case, the rod lift system runs without any problem and is sometimes referred to as "optimized" operation, although the well production is usually suboptimal and losing revenue. In another example, uncertainty related to inflow may lead to an overly aggressive approach, for example, where the system is designed or operated such that the pump displacement is higher than the inflow, such as by intermittent pumping. In this case, the downhole pump and rod lift system suffers from issues such as fluid pound, pump-off, gas interference, and correspondingly higher failure rates due to incomplete pump fillage.

Rod-pumped wells (e.g., reciprocating rod lift system 100) may be monitored to ensure the continued efficient and economic operations of a field. After a pumping unit has been installed in the field, dynamometer tests of pumping wells are conducted to determine the system efficiency, and whether adjustments should be made in operating parameters such as stroke length, pump speed, or other operating parameters, for example.

Typically, there are no sensors to measure conditions at the pump 104, which may be located thousands of feet underground. However, there exist numerical methods to calculate the position of the pump plunger 116 and the load acting on the plunger from measurements of the position of and load in the rod string 118 at the pumping unit located at the surface. These measurements are typically made at the top of the polished rod 102, which is a portion of the rod string 118 passing through a stuffing box 103.

Figure 2A:
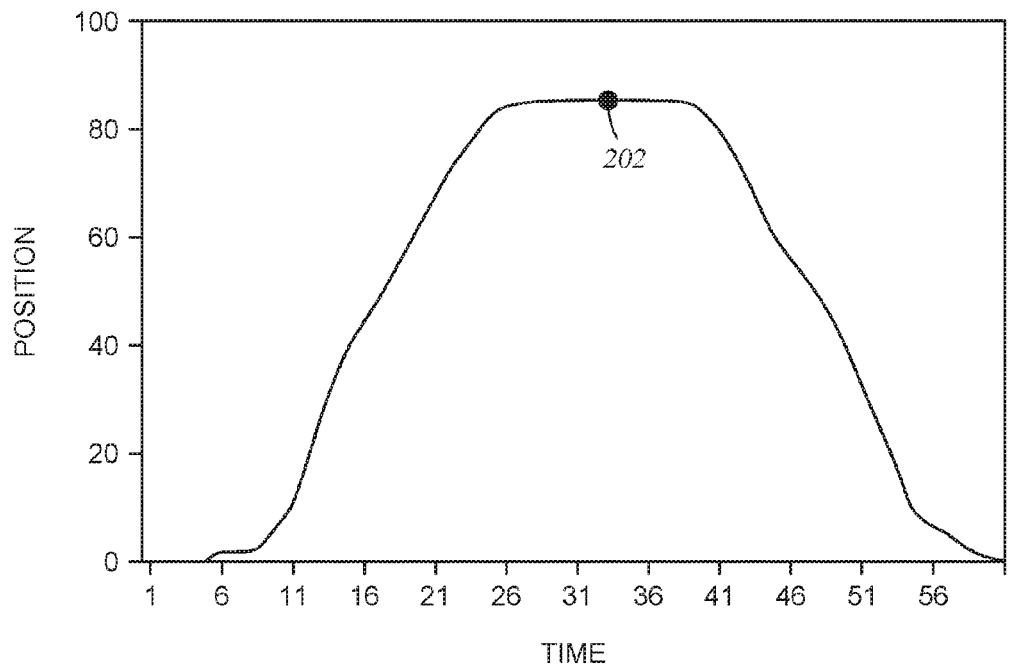
FIGS. 2A and 2B illustrate position versus time data for a completely filled or nearly filled well and a pumped off well, respectively.

If there is sufficient fluid in the wellbore, the pump barrel 106 may be completely filled during an upstroke. FIG. 2A illustrates position versus time data obtained downhole where the pump 104 may be completely or nearly filled. This represents ideal pump operation where the transfer point 202 may be at the TOS of the plunger 116 for a completely or nearly filled pump barrel 106.

Figure 2B:
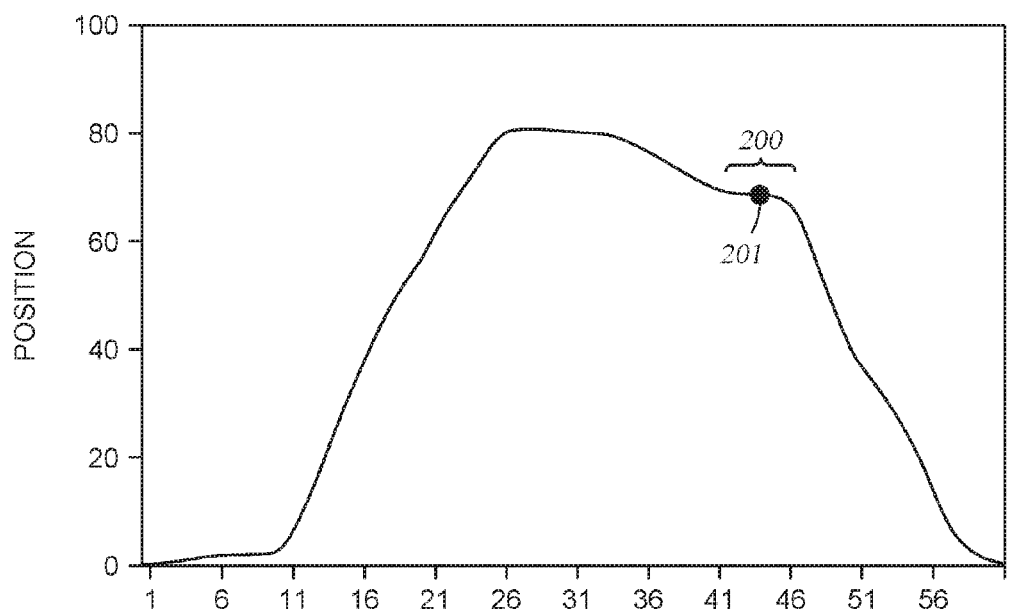

A condition may arise where the pump 104 is not completely filled with fluid on an upstroke. If there is not sufficient fluid in the wellbore, the barrel 106 may be only partially filled, and there may be a void left between the fluid and the plunger 116 as it continues to rise. Operating the pump system 100 with only a partially filled pump barrel is inefficient and, therefore, undesirable. The well is said to be "pumped off," and the condition is known as "pounding." For a pumped off well, in contrast with the completely filled pump of FIG. 2A, a plot of the position versus time data may contain a plateau 200, as shown in FIG. 2B. The plateau 200 may most likely contain the transfer point 201. For a pumped off well, the transfer point may most likely occur after the TOS of the plunger 116. Thus, well operators may wish to accurately determine the transfer point in an effort to monitor the pump fillage and to control the pump accordingly, thereby preventing damage to the rod string 118 and other components of the pump system 100.

Figure 3:
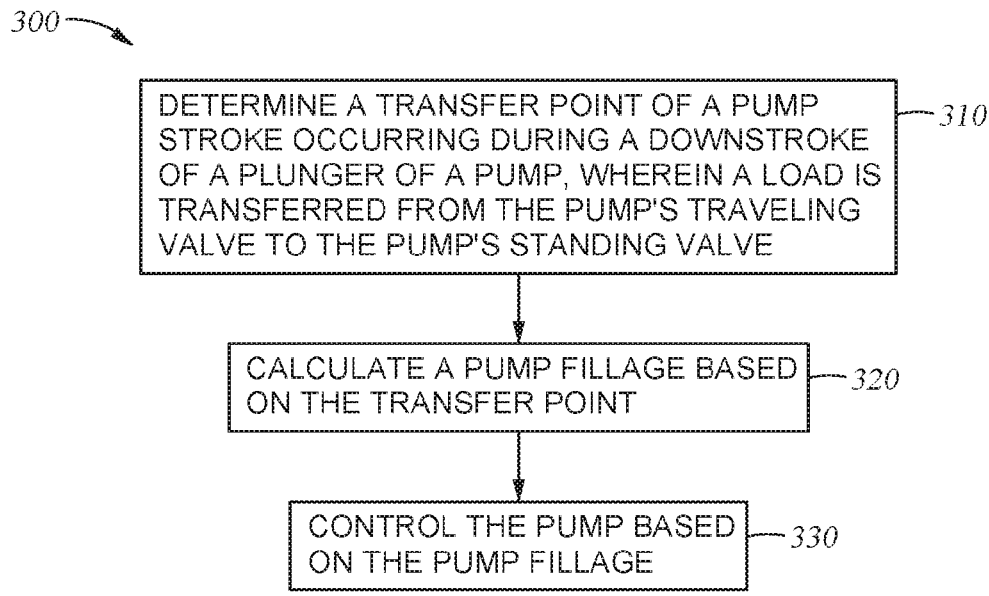
FIG. 3 is a flow diagram of exemplary operations for controlling a pump based on a transfer point of a pump stroke.

FIG. 3 illustrates operations 300 for controlling a pump system 100 based on a transfer point of a stroke, according to certain aspects of the present disclosure. The operations may begin at 310 by determining the transfer point, wherein a load is transferred from the pump's traveling valve 112 to the pump's standing valve 114. For some aspects, the transfer point may be continuously determined for each and every pump stroke. For other aspects, the transfer point may be determined periodically or, in some cases, less frequently when the transfer point is at or near the TOS, and more frequently, when the transfer point is determined to be substantially less than the TOS.

At 320, the pump fillage (a fluid volume) may then be calculated based on the transfer point. In other words, this fluid volume may be calculated by determining the volume of the pump barrel 106 between the transfer point and the BOS. If the transfer point is accurately determined, the calculated pump fillage may most likely be correct. A control unit 110, which may be located at the surface, may control the pump system 100 and, thus, the motion of the pump 104 based on the pump fillage at 330. For example, the control unit 110 may control the pump cycle frequency, the pump interval and the delay between pump intervals (i.e., the variable pump duty cycle). The pump fillage may also be used to compute pump efficiency, the produced volume and/or the average production rate.

Determining the Transfer Point Using a Method of Ratios

Figure 4:
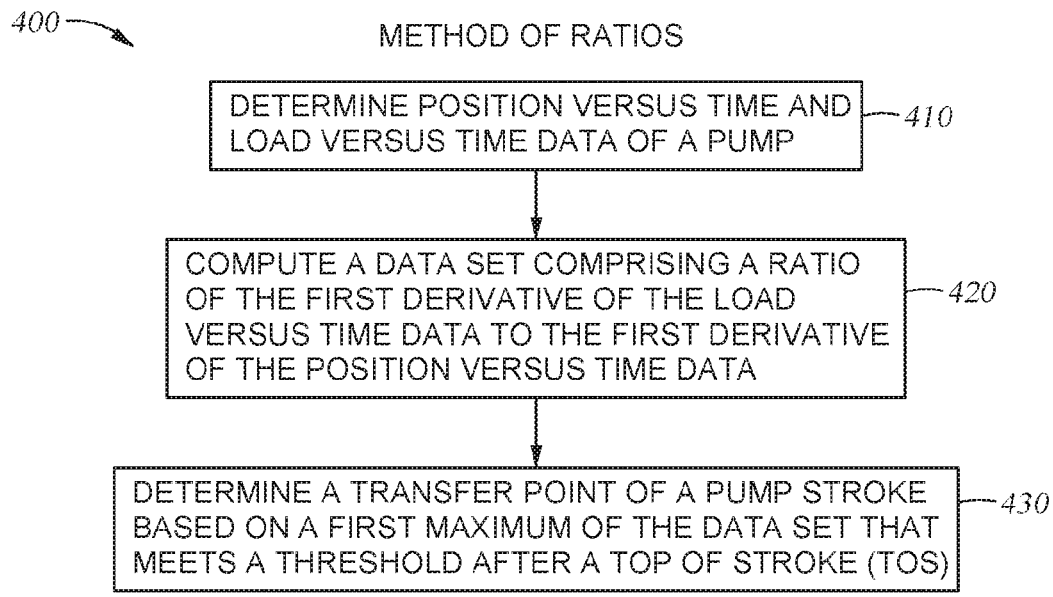
FIG. 4 is a flow diagram of exemplary operations for determining a transfer point of a pump stroke using a Method of Ratios, in accordance with certain aspects of the present disclosure.

Various numerical methods for accurately determining the transfer point may exist. For example, FIG. 4 illustrates operations 400 for determining the transfer point at 310 using a Method of Ratios, according to certain aspects of the present disclosure. Data sets comprising position and load of the pump 104 with respect to time may be determined from measurements made at the surface and/or downhole at 410 by any of various suitable sensors. For some aspects, the data sets may correspond to measurements made at the pump 104. For some aspects, the measurements may be transmitted to the control unit 110 for data collection and analysis.

Figure 5A:
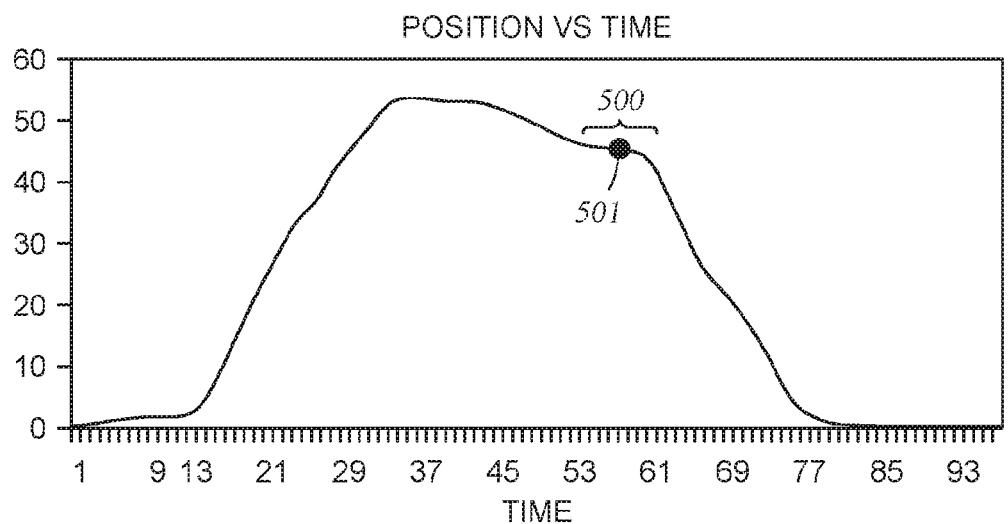
FIGS. 5A-C graphically illustrate data sets used in determining a transfer point of a pump stroke according to the operations of FIG. 4.
Figure 5B:
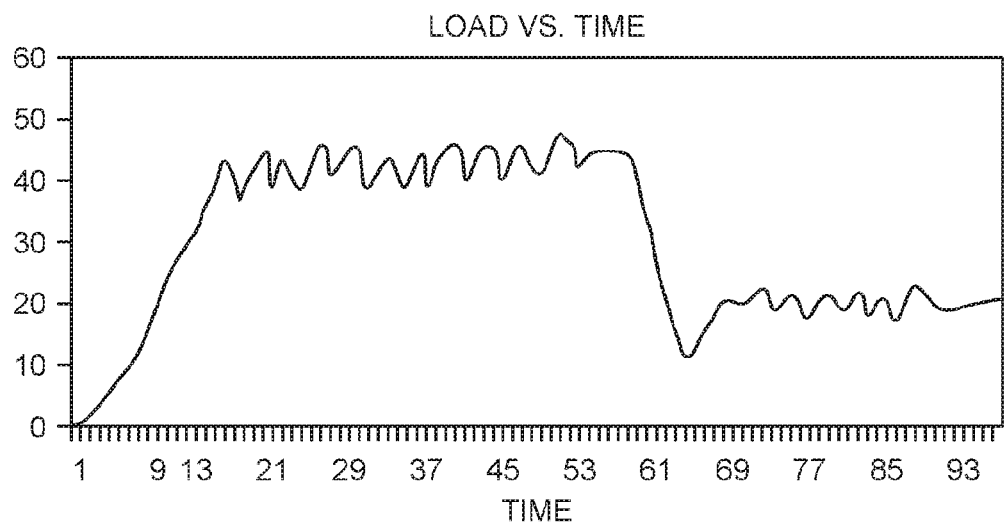

FIG. 5A displays a plot of example position versus time data, while FIG. 5B depicts a plot of example load versus time data. In FIG. 5A, a plateau 500 may indicate that the pump 104 is not completely filled during the part of the pump cycle where the plunger 116 is moving downward. The plateau 500 may most likely contain the transfer point 501. When the pump 104 is not completely filled, the transfer point may most likely occur after the TOS of the plunger 116.

Figure 5C:
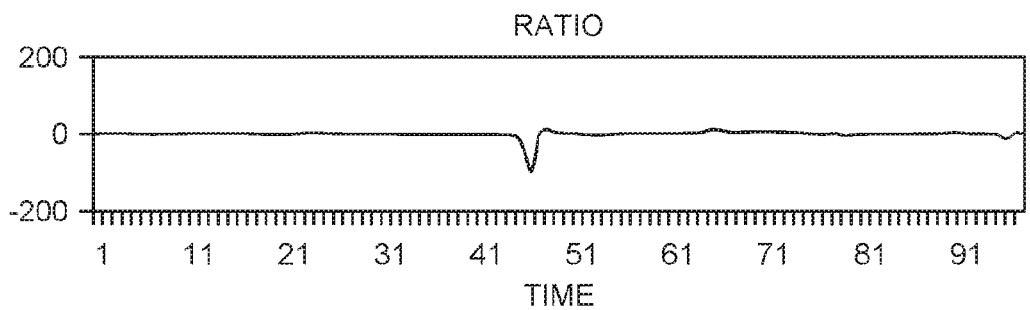

At 420, a data set may be computed, comprising a ratio of the first derivative of the load versus time data to the first derivative of the position versus time data, as displayed in FIG. 5C. The ratio may display a series of peaks after the TOS. For some aspects, the position and load data may be normalized before calculating the derivatives. At the transfer point, the first derivative of position with respect to time (i.e., velocity) exhibits a local maximum, and the first derivative of load with respect to time exhibits an absolute minimum. Individually, these phenomena are not always unique; however, the ratio of the first derivatives typically exhibits a distinct maximum at the transfer point. Therefore, the transfer point may be determined at 430 based on a maximum (e.g., the first maximum) of the ratio data set that exceeds a threshold after the TOS.

Determining the Transfer Point Using a Method of Positions

Figure 6:
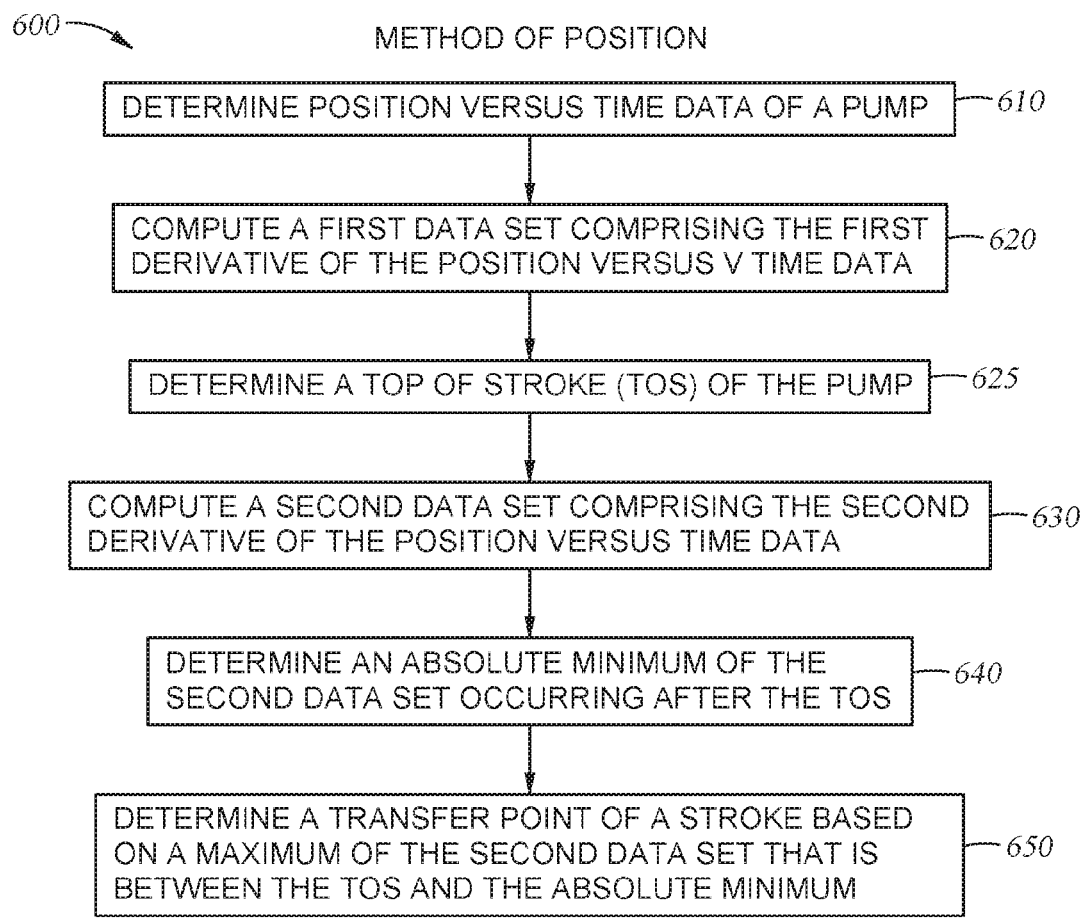
FIG. 6 is a flow diagram of exemplary operations for determining a transfer point of a pump stroke using a Method of Positions, according to certain aspects of the present disclosure.
Figure 7A:
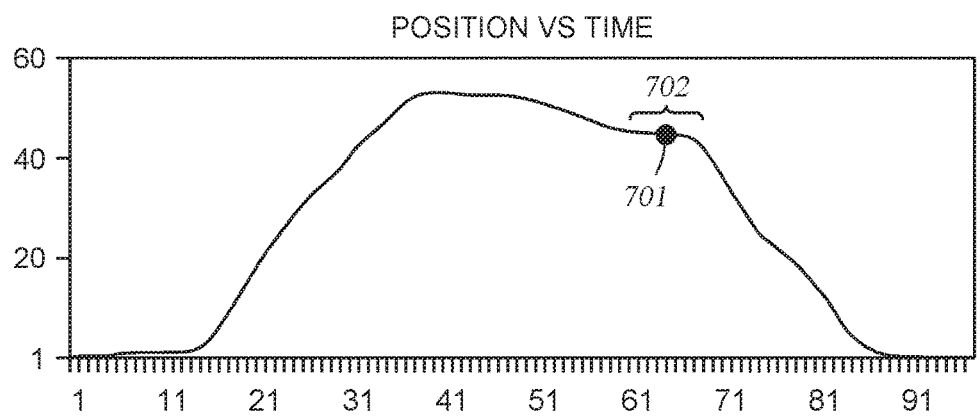
FIGS. 7A-C graphically illustrate data sets used in determining a transfer point of a stroke according to the operations of FIG. 6.

FIG. 6 illustrates operations 600 for determining the transfer point at 310 using a Method of Positions, according to certain aspects of the present disclosure. Position of the pump 104 with respect to time may be determined from measurements made at the surface and/or downhole at 610 by any of various suitable sensors. For some aspects, the position versus time data may correspond to measurements made at the pump 104. A plot of example position versus time data is displayed in FIG. 7A. In FIG. 7A, a plateau 702 may indicate that the pump 104 is not completely filled during the part of the pump cycle where the plunger 116 is moving downward. The plateau 702 may most likely contain the transfer point 701 at the inflection point. When the pump 104 is not completely filled, the transfer point may occur after the TOS of the plunger 116.

Figure 7B:
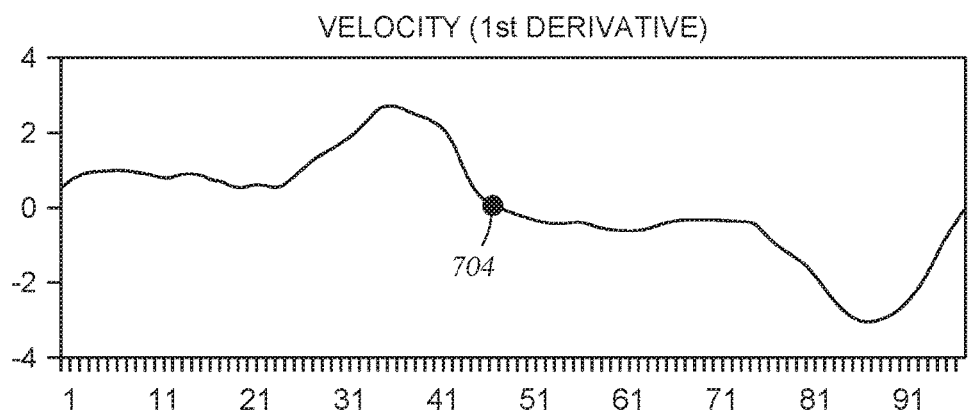

At 620, a first data set may be computed comprising the first derivative of the position versus time data (i.e., velocity). At 625, the TOS of the pump, and more specifically of the plunger, may be determined. For some aspects, determining the TOS of the plunger may comprise finding a critical value 704 of the first data set, as displayed in FIG. 7B. For other aspects, the TOS may be simply determined to occur at the maximum position in the position versus time data.

Figure 7C:
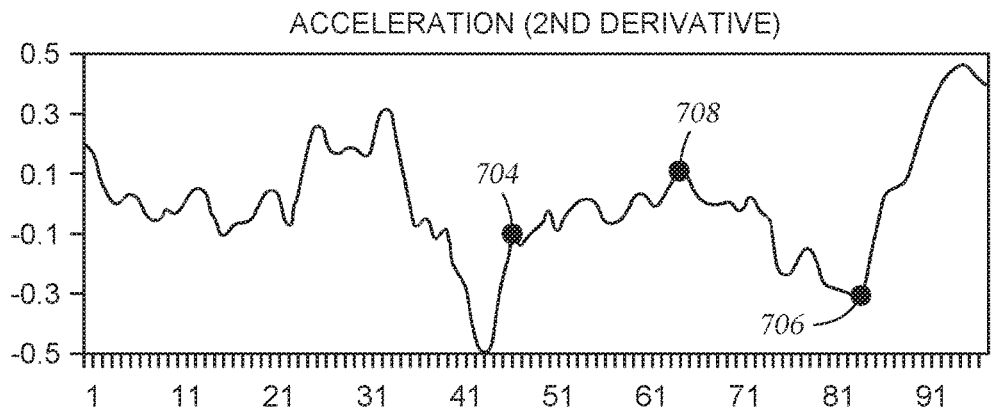

A second data set may be computed at 630 comprising the second derivative of the position versus time data (i.e., acceleration), and at 640, an absolute minimum 706 of the second data set occurring after the position corresponding to the TOS may be determined, as displayed in FIG. 7C. At 650, the transfer point may be determined based on a maximum 708 of the second data set that occurs between the TOS and the absolute minimum 706.

Data below a minimum pump fillage threshold (e.g., about 10-15%, or more preferably about 5%) may not be used in determining the transfer point because the calculation of the pump fillage at 320 may not be accurate. If the maximum 708 is not above the minimum pump fillage threshold, then this position may not be considered as the transfer point because an accurate pump fillage cannot be guaranteed.

Determining the Transfer Point Using a Method of Areas

Figure 8:
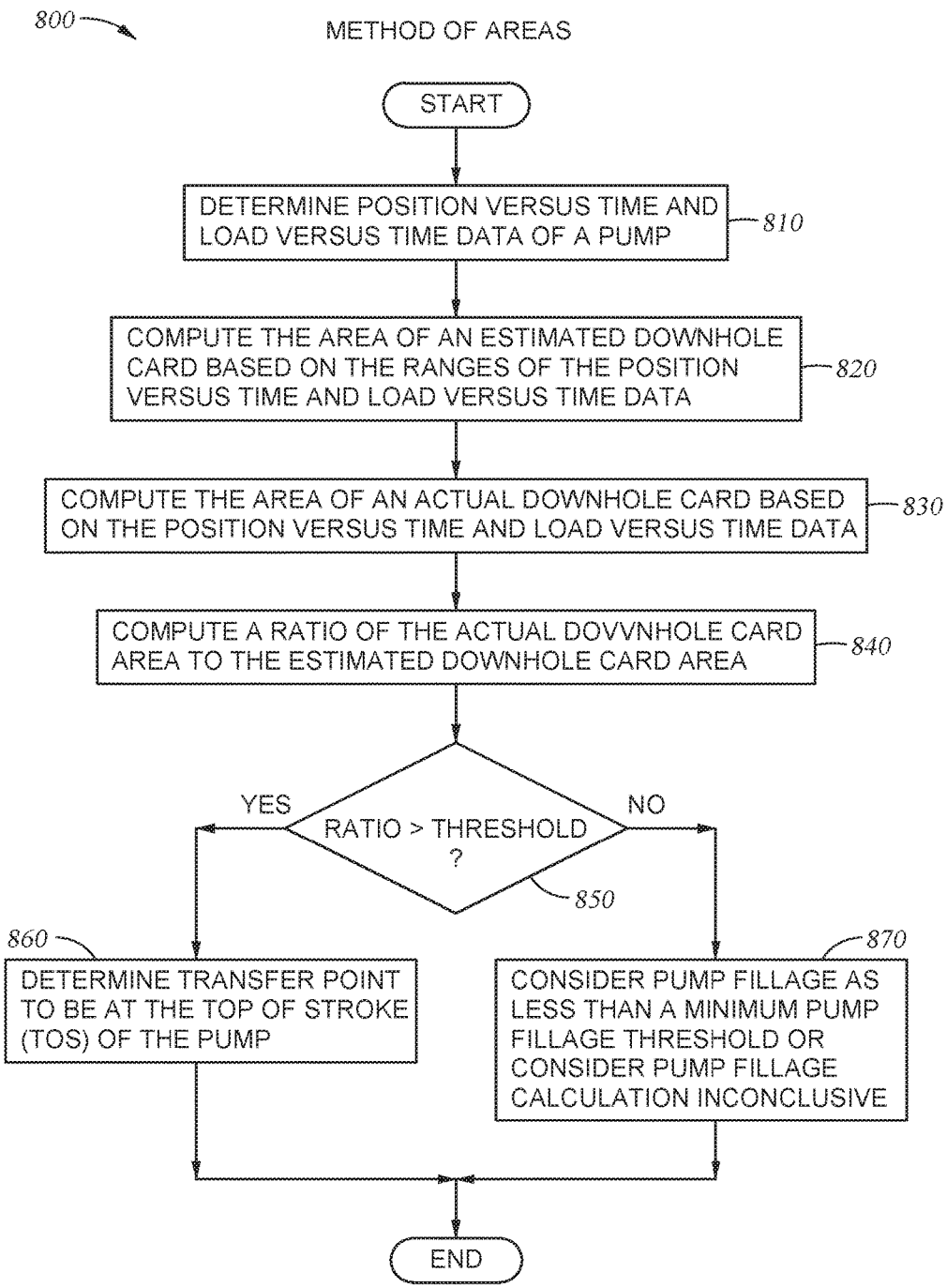
FIG. 8 is a flow diagram of exemplary operations for determining a transfer point of a stroke using a Method of Areas, in accordance with certain aspects of the present disclosure.

FIG. 8 illustrates operations 800 for determining the transfer point at 310 using a Method of Areas, according to certain aspects of the present disclosure. The Method of Areas may be used, for example, when there is sufficient fluid in the wellbore to cause the pump barrel 106 to be completely filled or nearly filled, as illustrated in FIG. 2A, such that the Method of Ratios of FIG. 4 or the Method of Positions of FIG. 6 fail to determine the transfer point, which may be at or near the TOS of the plunger 116. In addition, the Method of Areas may be used when the well is pumped off enough that the pump fillage is less than the minimum pump fillage threshold (e.g., about 10-15%, or more preferably about 5%).

In the Method of Areas, the position versus time and load versus time data may be determined at 810 from measurements made at the surface and/or downhole using any of various suitable sensors. For some aspects, the data may correspond to measurements made at the pump 104. At 820, the area of an estimated ideal rectangular downhole card may be computed, based on the ranges of the position versus time and load versus time data. In other words, the maximum and the minimum load and the maximum and the minimum position may be determined. Then, the difference between the maximum and minimum positions may be multiplied by the difference between the maximum and minimum loads to compute the estimated downhole card area.

At 830, the area of an actual downhole card corresponding to the position versus time and load versus time data may be computed. For some aspects, this actual downhole card area may be computed using Riemann sums. At 840, a ratio may be computed of the actual downhole card area, which represents the energy expended at the pump, to the estimated downhole card area.

At 850, if the ratio is greater than a threshold (e.g., around 80%, or more preferably at least 60%), then the transfer point may be determined as being at the TOS of the plunger at 860. If the ratio is less than or equal to the threshold at 850, then, at 870, the pump fillage may be determined as being less than the minimum pump fillage threshold, or the pump fillage calculation may be considered as inconclusive (i.e., bad data). Any time the pump fillage calculation (PFC)

is considered inconclusive, the transfer point may be determined on the next or any subsequent pump stroke.

Determining the Transfer Point Using a Modified Method of Positions

Figure 9:
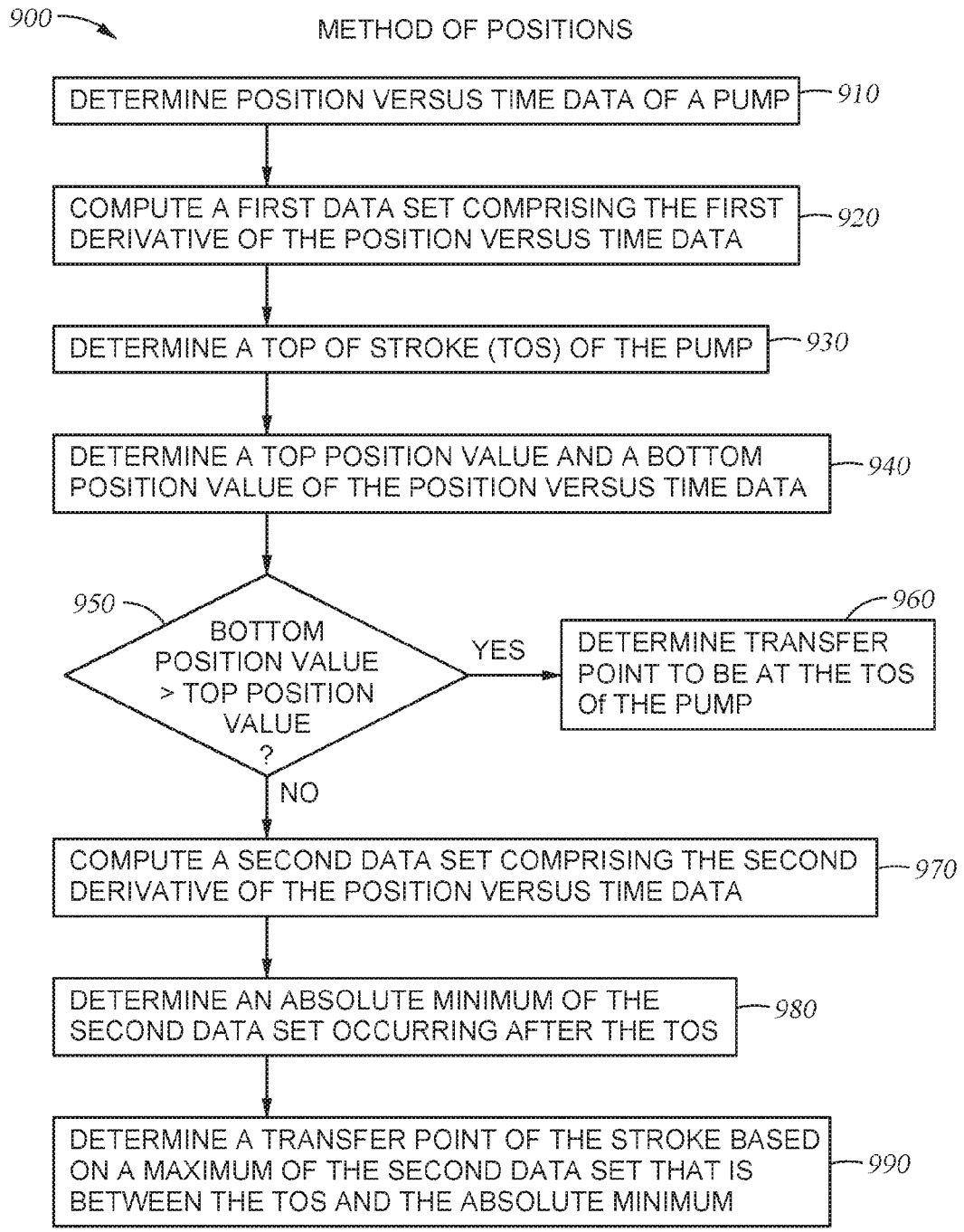
FIG. 9 is a flow diagram of exemplary operations for determining a transfer point of a pump stroke using a modified Method of Positions, in accordance with certain aspects of the present disclosure.
Figure 10:
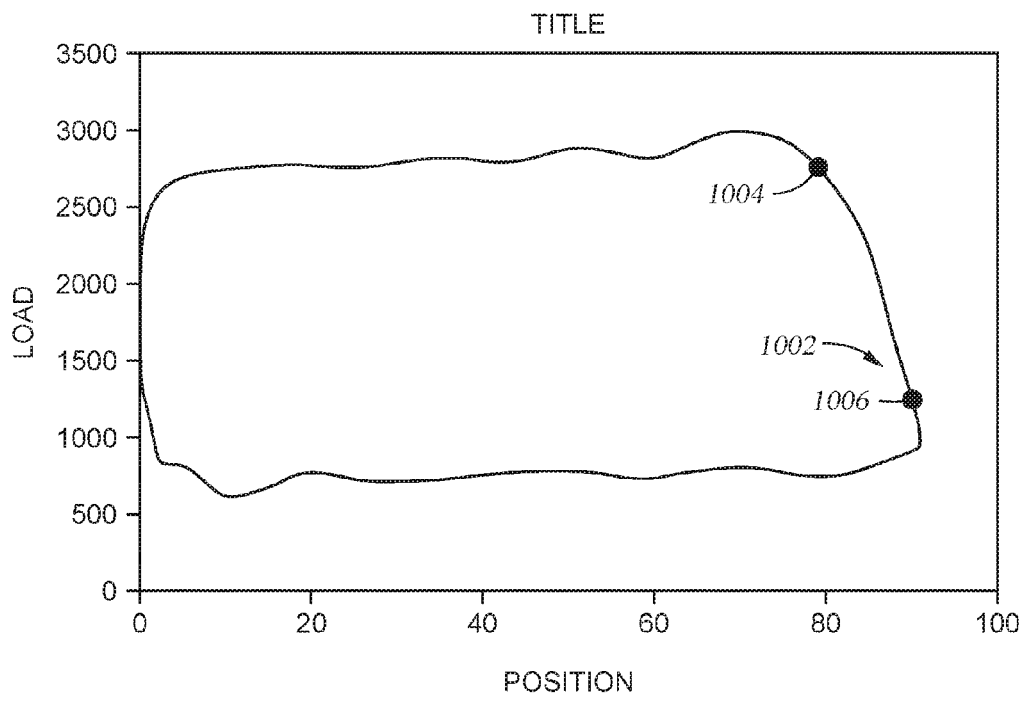
FIG. 10 illustrates a downhole card leaning to the right.

FIG. 9 illustrates operations 900 for determining the transfer point at 310 using a modified Method of Positions, according to certain aspects of the present disclosure. The modified Method of Positions may be used, for example, to catch an event occurring when the bottom right of a downhole card may lean to the right. FIG. 10 illustrates an example downhole card leaning to the right at 1002. This method may compare a position value 1004 at the top of the card with a position value 1006 at the bottom of the card. If the position value 1006 at the bottom of the card is greater than the position value 1004 at the top of the card, the pump fillage may be set automatically to 100%. For some aspects, the pump fillage may only be set to 100% if the position value 1006 is greater than the position value 1004 by a predetermined threshold.

Position of the pump 104 with respect to time may be determined from measurements made at the surface and/or downhole at 910 by any of various suitable sensors. For some aspects, the position versus time data may correspond to measurements made at the pump 104. A plot of example position versus time data is displayed in FIG. 7A. In FIG. 7A, a plateau 702 may indicate that the pump 104 is not completely filled during the part of the pump cycle where the plunger 116 is moving downward. The plateau 702 may most likely contain the transfer point 701 at the inflection point. When the pump 104 is not completely filled, the transfer point may occur after the TOS of the plunger 116.

At 920, a first data set may be computed, comprising the first derivative of the position versus time data (i.e., velocity). At 930, the TOS of the pump, and more specifically of the plunger, may be determined. For some aspects, determining the TOS of the plunger may comprise finding a critical value 704 of the first data set, as displayed in FIG. 7B. For other aspects, the TOS may be simply determined to occur at the maximum position in the position versus time data.

At 940, a top position value 1004 and a bottom position value 1006 of the position versus time data may be determined. At 950, if the bottom position value 1006 is greater than the top position value 1004 (i.e., the bottom right of a downhole card may be leaning to the right), then the transfer point may be determined to be at the TOS of the pump at 960.

If the bottom position value 1006 is less than or equal to the top position value 1004, a second data set may be computed at 970 comprising the second derivative of the position versus time data (i.e., acceleration). At 980, an absolute minimum 706 of the second data set occurring after the position corresponding to the TOS may be determined, as displayed in FIG. 7C. At 990, the transfer point may be determined based on a maximum 708 of the second data set that occurs between the TOS and the absolute minimum 706.

Data below a minimum pump fillage threshold (e.g., about 10-15%, or more preferably about 5%) may not be used in determining the transfer point because the calculation of the pump fillage at 320 may not be accurate. If the maximum 708 is not above the minimum pump fillage threshold, then this position may not be considered as the transfer point because an accurate pump fillage cannot be guaranteed.

Determining the Transfer Point Using a Method of Loads

Figure 11:
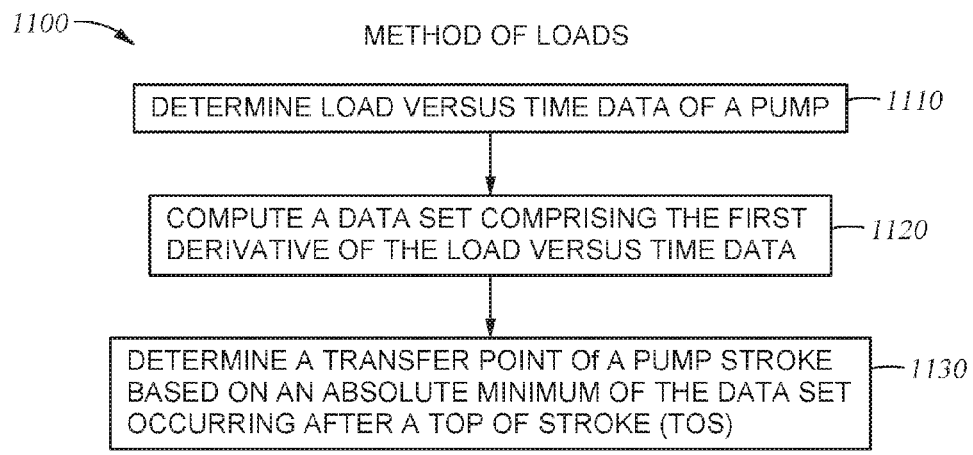
FIG. 11 is a flow diagram of exemplary operations for determining a transfer point of a pump stroke using a Method of Loads, in accordance with certain aspects of the present disclosure.

FIG. 11 illustrates operations 1100 for determining the transfer point at 310 using a Method of Loads, according to certain aspects of the present disclosure. Load of the pump 104 with respect to time may be determined from measurements made at the surface and/or downhole at 1110 by any of various suitable sensors. For some aspects, the load versus time data may correspond to measurements made at the pump 104. For some aspects, the measurements may be transmitted to the control unit 110 for data collection and analysis. An exemplary plot of load versus time is displayed in FIG. 5B.

Figure 12:
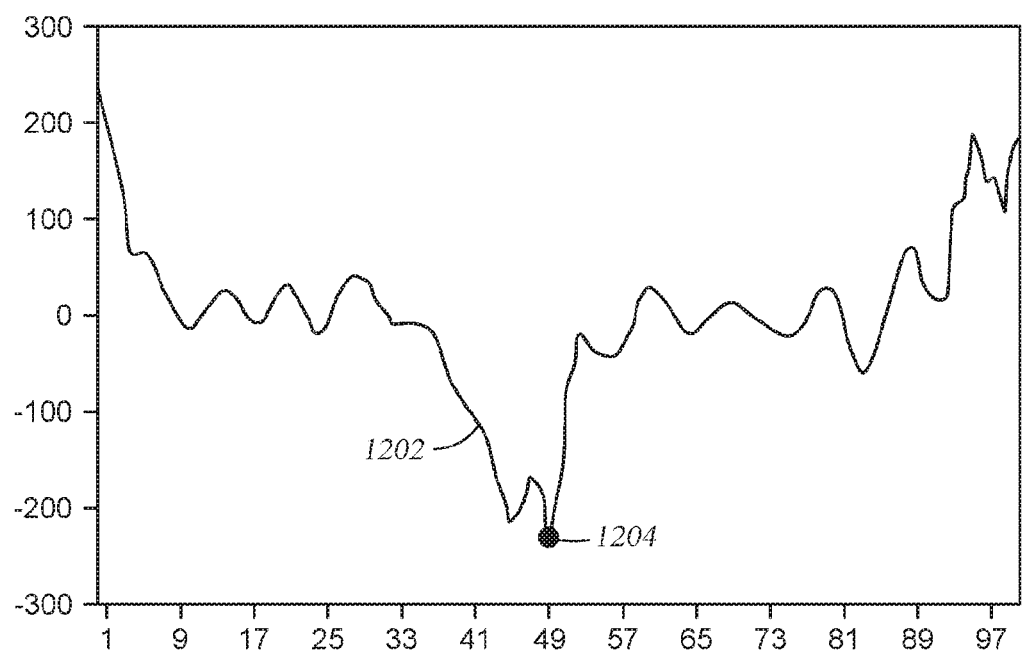
FIG. 12 graphically illustrates a data set used in determining a transfer point of a stroke according to the operations of FIG. 11.

At 1120, a data set may be computed, comprising the first derivative of the load versus time data, as displayed in FIG. 12. During the downstroke, wherein the load on the rod string 118 may be reduced, the first derivative of the load versus time data may indicate a negative slope 1202. The transfer point may be determined at the end of the downstroke at 1130 based on an absolute minimum 1204 of the data set occurring after a top of stroke (TOS). For some aspects, the Method of Loads may be modified similar to the Method of Positions of FIG. 9 to catch the event occurring when the bottom right of a downhole card may lean to the right, wherein the pump fillage may be set automatically to 100%.

Determining Pump Fillage Using a Method of Ordering

Figure 13:
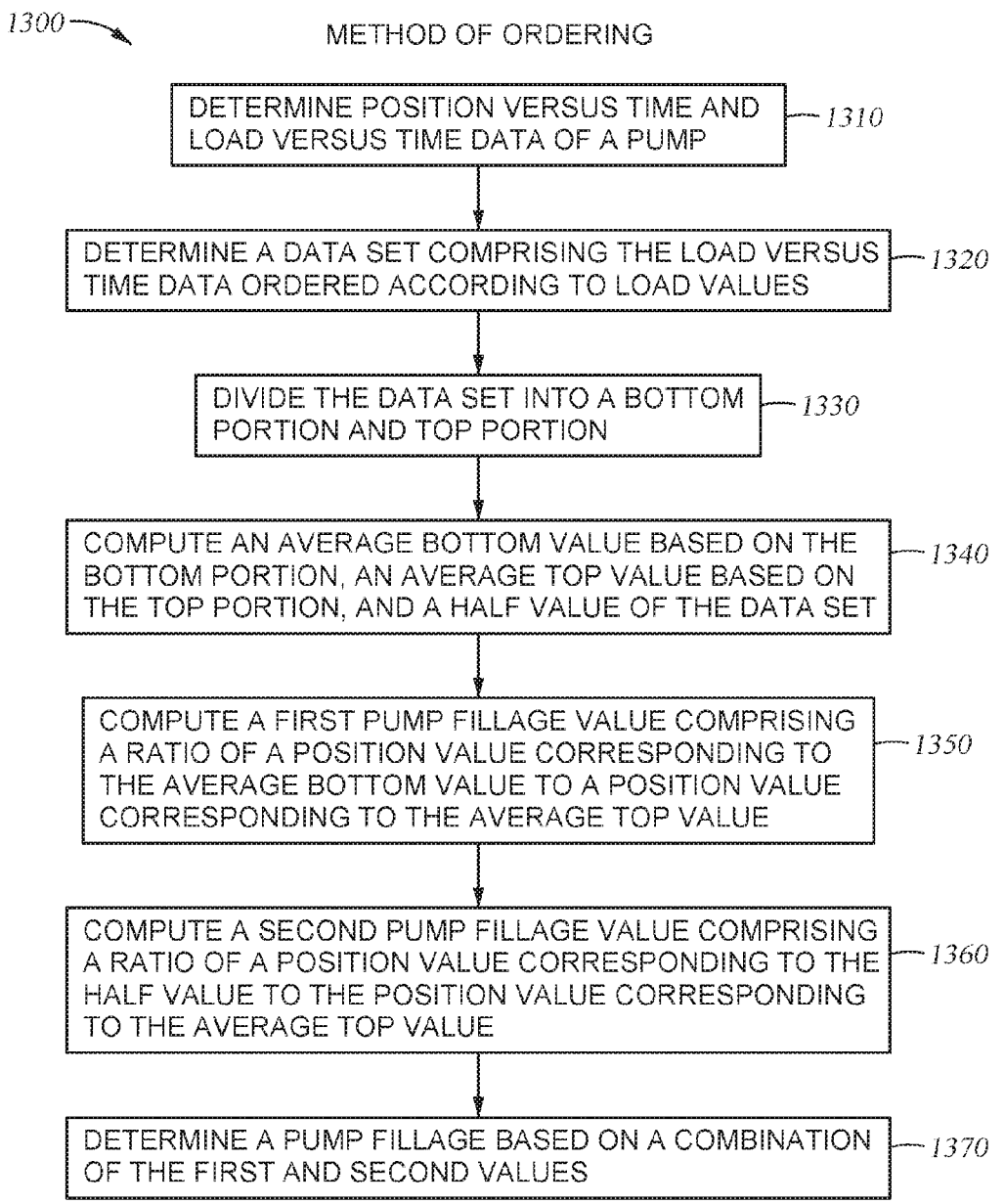
FIG. 13 is a flow diagram of exemplary operations for determining a pump fillage of a pump stroke using a Method of Ordering, in accordance with certain aspects of the present disclosure.

FIG. 13 illustrates operations 1300 for determining pump fillage using a Method of Ordering, according to certain aspects of the present disclosure. The Method of Ordering relies on ordering downhole data according to load values. The method may separate the data in load sections, wherein the pump fillage may be found.

Data sets comprising position and load of the pump 104 with respect to time may be determined from measurements made at the surface and/or downhole at 1310 by any of various suitable sensors. For some aspects, the data sets may correspond to measurements made at the pump 104. For some aspects, the measurements may be transmitted to the control unit 110 for data collection and analysis.

FIG. 5A displays a plot of example position versus time data, while FIG. 5B depicts a plot of example load versus time data. In FIG. 5A, a plateau 500 may indicate that the pump 104 is not completely filled during the part of the pump cycle where the plunger 116 is moving downward. The plateau 500 may most likely contain the transfer point 501. When the pump 104 is not completely filled, the transfer point may most likely occur after the TOS of the plunger 116.

Figure 14:
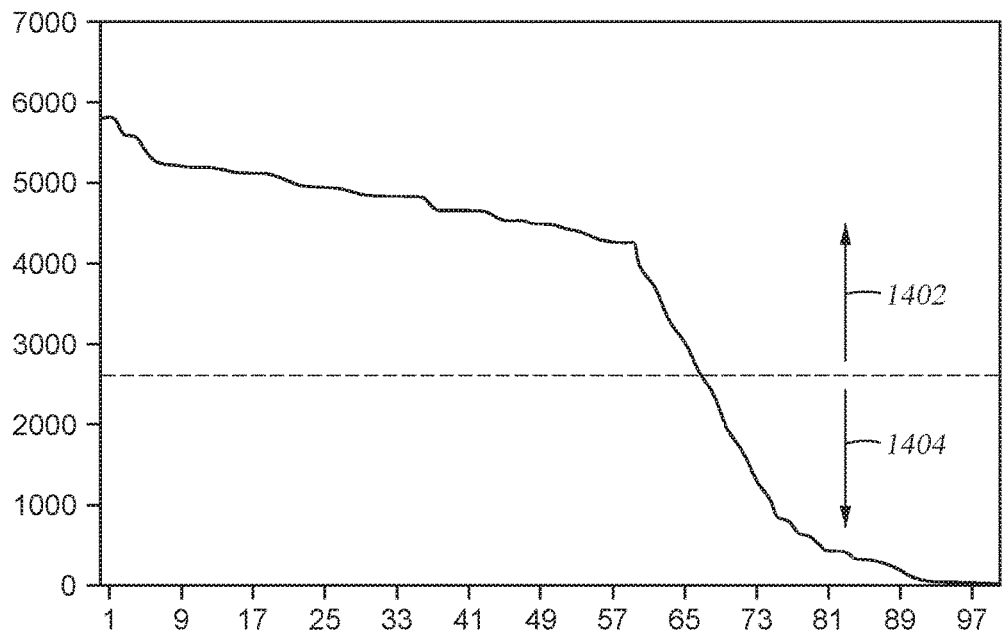
FIGS. 14-15 graphically illustrate data sets used in determining a pump fillage of a stroke according to the operations of FIG. 13.

At 1320, a data set may be determined comprising the load versus time data ordered according to load values. The data set may be ordered according to increasing or decreasing load values. FIG. 14 illustrates a data set ordered by decreasing load values. At 1330, the data set may be divided into a top portion 1402 and a bottom portion 1404. It is to be understood that the top and bottom portions 1402, 1404 need not be equal portions. For some aspects, the top portion 1402 and the bottom portion 1404 may comprise a top half and a bottom half, respectively.

Figure 15:
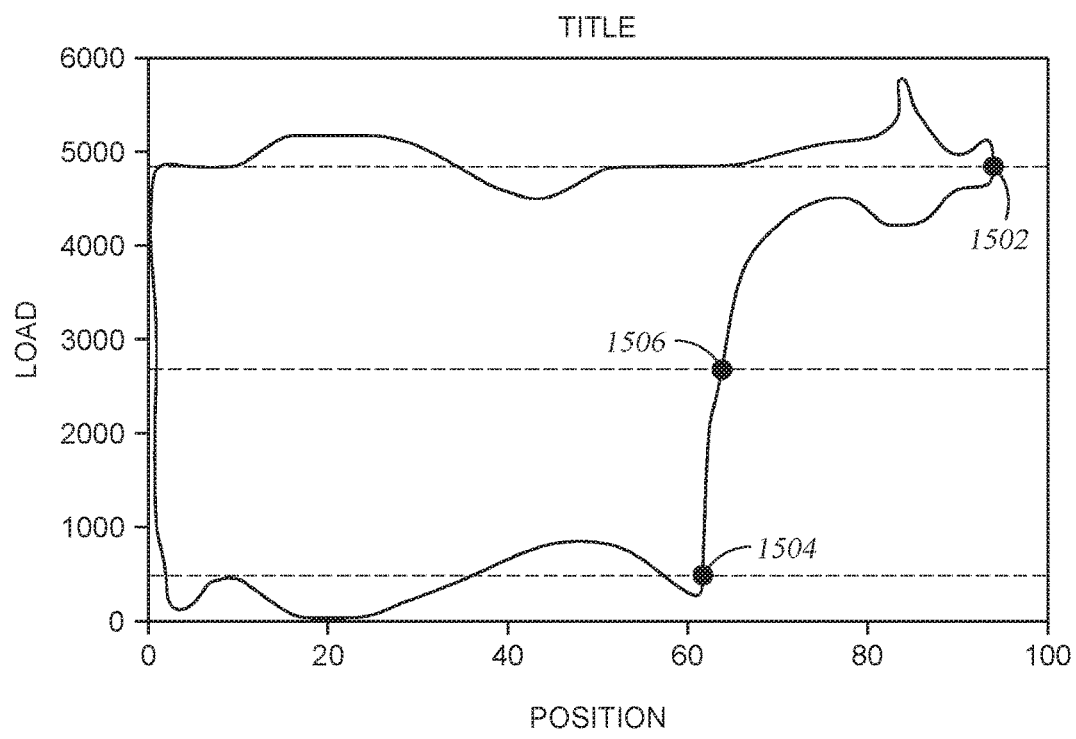

At 1340, the top portion 1402 and the bottom portion 1404 of the data set may be used to approximate a position value 1502 corresponding to an average top value and a position value 1504 corresponding to an average bottom value, respectively. A position value 1506 corresponding to a half value may also be computed at 1340 representing the 50% point of the downhole data, as displayed in FIG. 15. At 1350, a first pump fillage value may be computed, comprising a ratio of the position value 1504 (corresponding to the average bottom value) to the position value 1502 (corresponding to the average top value). At 1360, a second pump fillage value may be computed, comprising a ratio of the position value 1506 (corresponding to the half value) to the position value 1502 (corresponding to the average top value). At 1370, a pump fillage may be determined based on a combination (e.g., an average) of the first and second pump fillage values.

Determining Pump Fillage Using a Method of Multiple Pump Fillage

Figure 16:
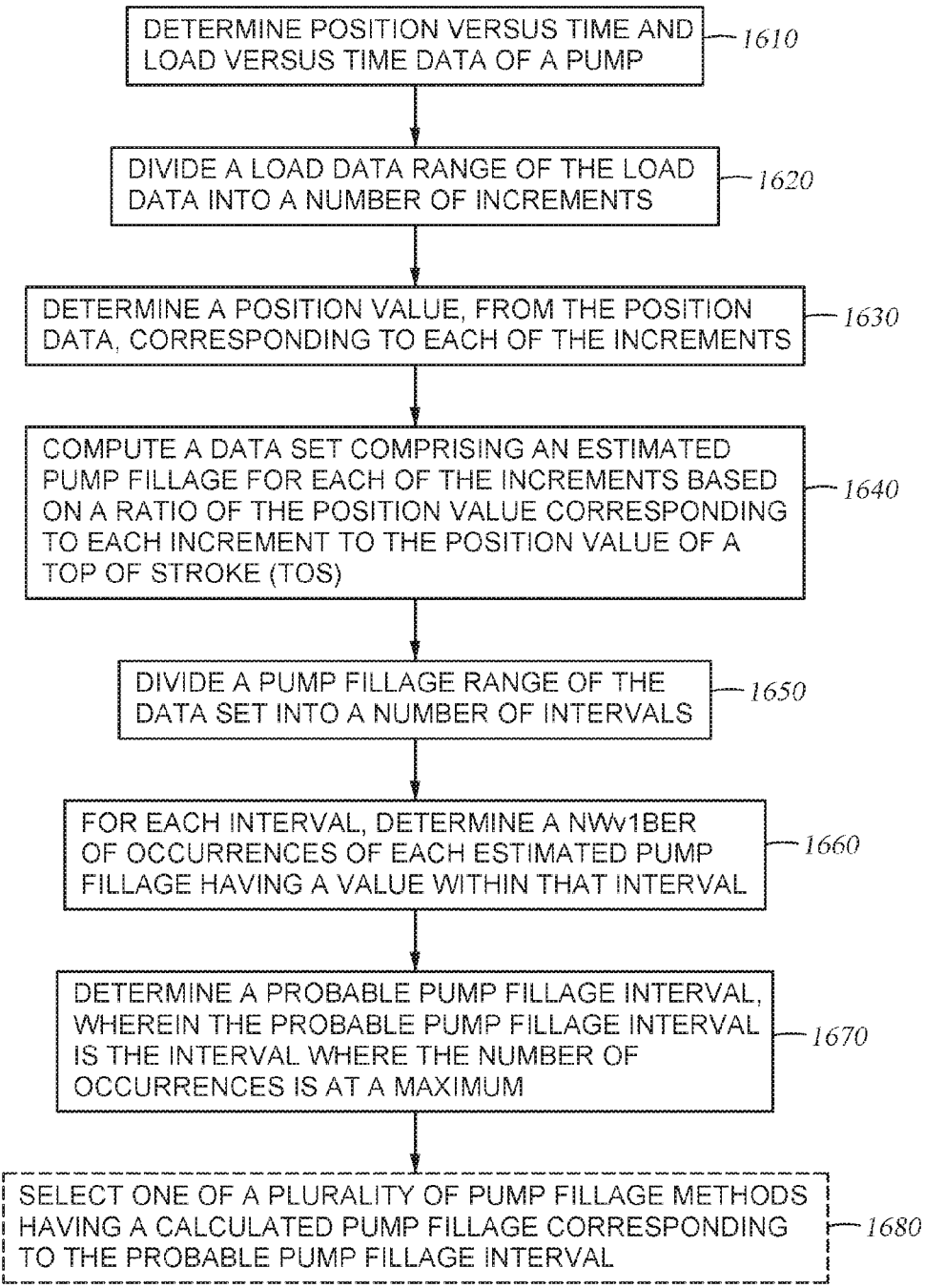
FIG. 16 is a flow diagram of exemplary operations for verifying a pump fillage of a pump stroke using a Method of Multiple Pump Fillage, in accordance with certain aspects of the present disclosure.

FIG. 16 illustrates operations 1600 for verifying a pump fillage using a Method of Multiple Pump Fillage, according to certain aspects of the present disclosure. The Method of Multiple Pump Fillage may be used, for example, as a check for the correct pump fillage, which may be selected from one of a plurality of pump fillage methods described above, having a calculated pump fillage. The method may compute an estimated pump fillage at several places on a downhole card and use statistical analysis to verify the correct value for the pump fillage. This method may be used as a check in the event that the above-described methods yield different pump fillages.

Data sets comprising position and load of the pump 104 with respect to time may be determined from measurements made at the surface and/or downhole at 1610 by any of various suitable sensors. For some aspects, the data sets may correspond to measurements made at the pump 104. At 1620, a load data range of the load data may be divided into a number of increments N (e.g., 20). For some aspects, the load value at each increment may be determined by first computing a ratio of the load span to the number of increments N. Then with the first increment having a load value of zero, the ratio may be added at each increment to determine respective load values.

Figure 17:
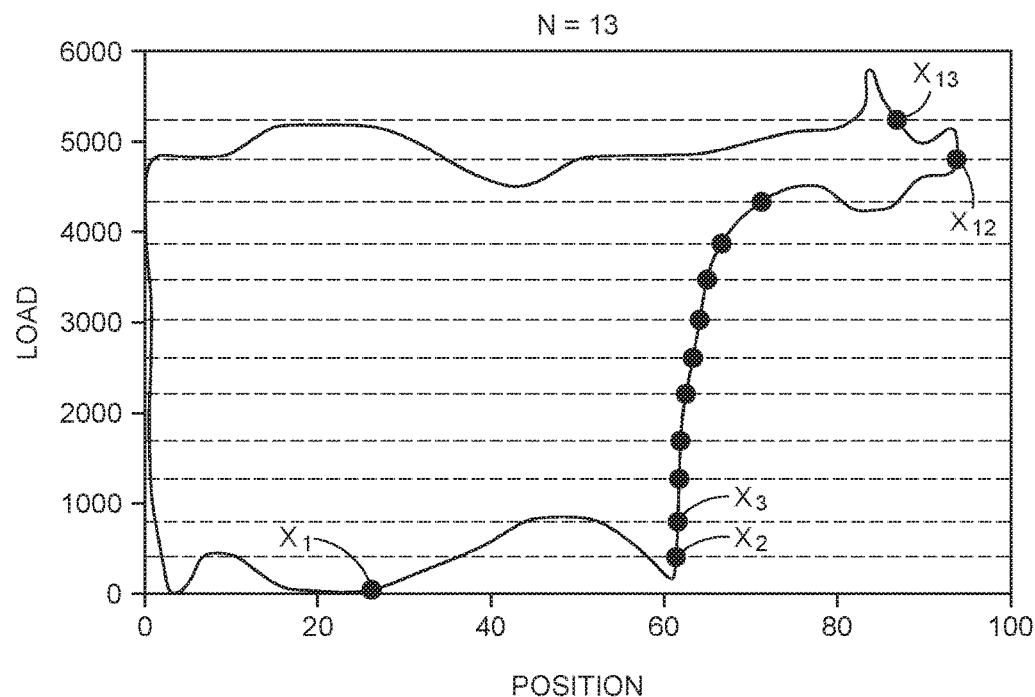
FIGS. 17-18 graphically illustrate data sets used in verifying a pump fillage of a stroke according to the operations of FIG. 16.

At 1630, a position value from the position data, corresponding to each of the increments, may be determined. For example, FIG. 17 illustrates position values (x1 ... x13) for 13 increments (i.e., N=13). At 1640, a data set comprising an estimated pump fillage for each of the increments may be computed based on a ratio of the position value corresponding to each increment (x1 ... x13) to the position value of a top of stroke (TOS). At 1650, a pump fillage range of the data set may be divided into a number of intervals. At 1660, for each interval, a number of occurrences of each estimated pump fillage having a value within that interval may be determined. For some aspects, a probability density function may be calculated for the intervals.

Figure 18:
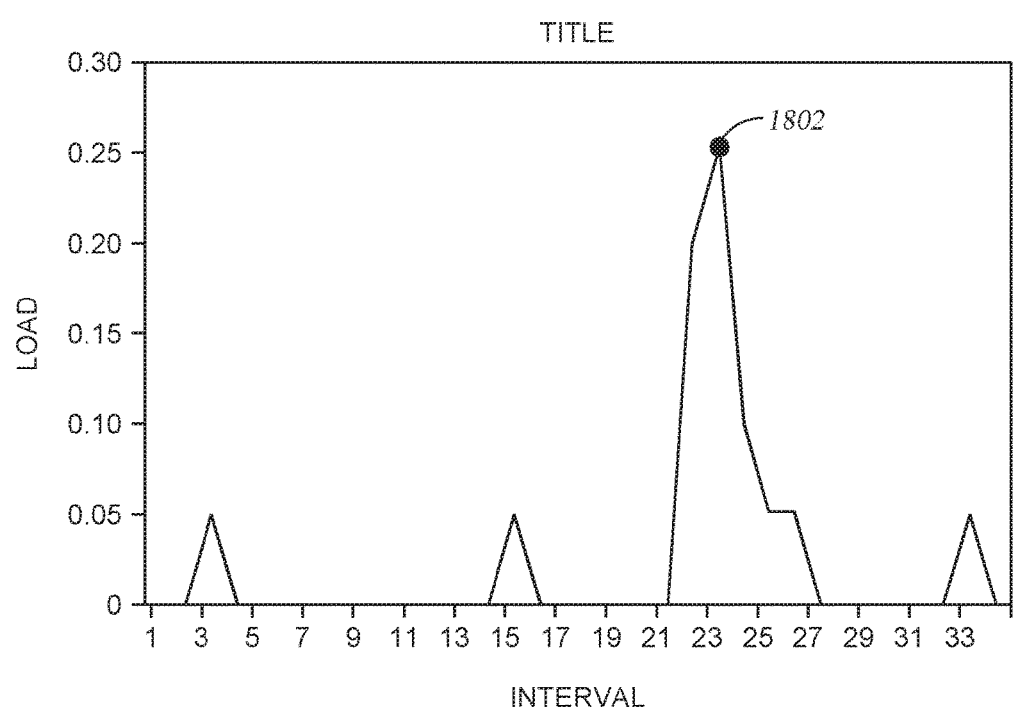

At 1670, a probable pump fillage interval may be determined, wherein the probable pump fillage interval is the interval where the number of occurrences is at a maximum. For some aspects, a value in the probable pump fillage interval may be considered as the pump fillage (e.g., the lowest value, the median value, or the highest value). For other aspects, at 1680, one of a plurality of pump fillage methods described above, having a calculated pump fillage corresponding to the probable pump fillage interval, may be selected. This selected, calculated pump fillage may be considered as the pump fillage. For example, FIG. 18 illustrates the data set divided into 34 intervals, showing a probability density function of the pump fillage distribution, wherein a peak 1802 may indicate the pump fillage interval where the pump fillage may lie. The number of increments and intervals may be increased to produce more accurate results, but exceeding a certain number of increments may pick up fluctuations.

Diagnostics of Downhole Dynamometer Data for Control and Troubleshooting of Reciprocating Rod Lift Systems An approach is provided herein for the automatic interpretation and analysis of downhole data ensuring accurate diagnosing and control of each well for every stroke. For example, a method of slopes may be used to determine pump fillage, as well as values for standing valve opening, standing valve closing, traveling valve opening. Another method is provided for segmenting the downhole card into finite increments that may be used for improved diagnostics, control, and troubleshooting of reciprocating rod lift systems. For example, a section (e.g., quadrant) search may be performed for the finite increments to identify a dynamometer card shape (pattern) which may identify (correspond to) a particular downhole condition. Thus, by segmenting the downhole card (data) into finite increments—and using the method of slopes to determine the standing valve opening, standing valve closing, and traveling valve opening values—a detailed analysis is possible. For example, it may be possible to identify not only the downhole condition indicated by the card shape, but also where (e.g., in which rod part) the condition exists. This detailed analysis may be useful for pump control.

Example Method of Slopes to Determine Standing Valve Opening, Standing Valve Closing, Traveling Valve Opening, and Pump Fillage According to certain aspects, a Method of Slopes may use non-dimensional slope values between points of downhole data to compute parameters such as pump fillage, traveling valve opening, standing valve opening, and standing valve closing.

Figure 19:
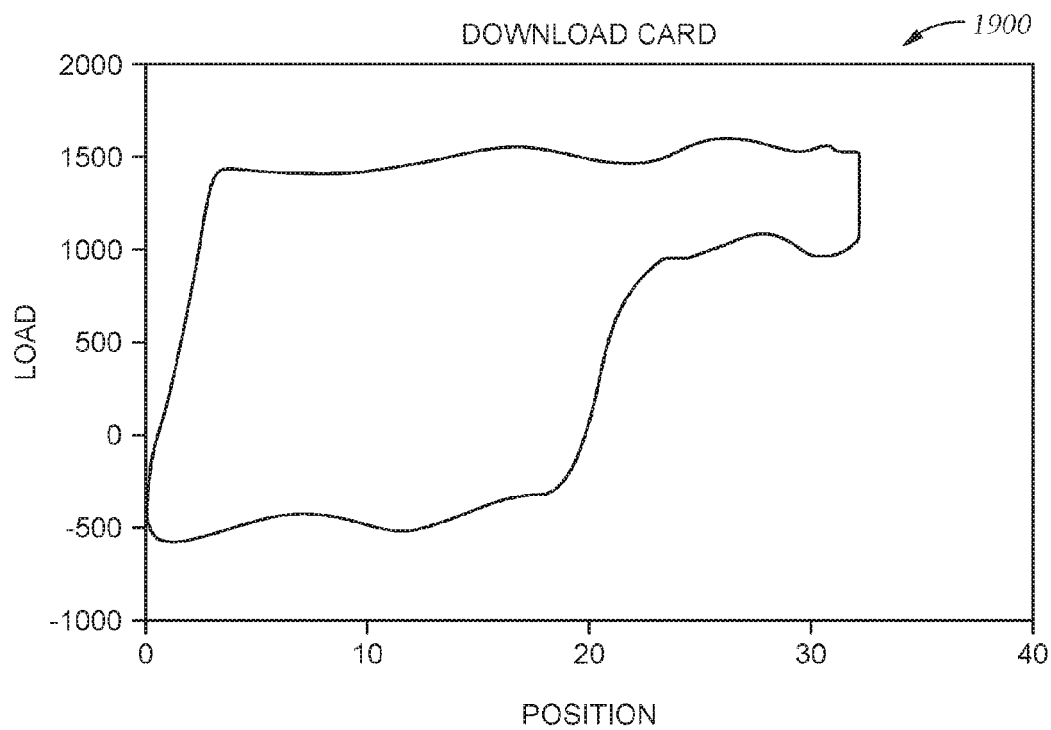
FIG. 19 illustrates an example downhole card computed from downhole data, in accordance with certain aspects of the present disclosure.

FIG. 19 illustrates an example downhole card 1900 computed from downhole data, in accordance with certain aspects of the present disclosure. A point may refer to a position value (displacement), on the x-axis, and a corresponding load value, on the y-axis, of the downhole data.

The downhole data may be converted to non-dimensional load and position data (e.g., normalized). For example, a position span may be the difference in position between corresponding points on the downhole card 1900. Corresponding points may be points that having the same load value, but different position values. Similarly a load span may be the difference in load between corresponding points on the downhole card 1900 having the same position value, but different load values. The downhole data may be converted to non-dimensional data by dividing position values by the maximum position span and by dividing load values by the maximum load span.

According to certain aspects, the non-dimensional data points may be used to calculate non-dimensional slope values based on the following equation:

(Equation 1)

$$\text{slope}(i) = (\text{ndload}(i+1) - \text{ndload}(i))/(\text{ndpos}(i-1) - \text{ndpos}(i)) \quad (1)$$

where slope is the slope vector for each point i for i=1 ... N, ndload is the non-dimensional load data and ndpos is the non-dimensional position data. In other words, the rod load value for a first point is subtracted from the rod load value for a second point and rod load difference for the first and second point is divided by the rod position difference of the first and second points. This may be performed for every pair of data points of the downhole data, for example, pairs of adjacent data points.

Figure 20:
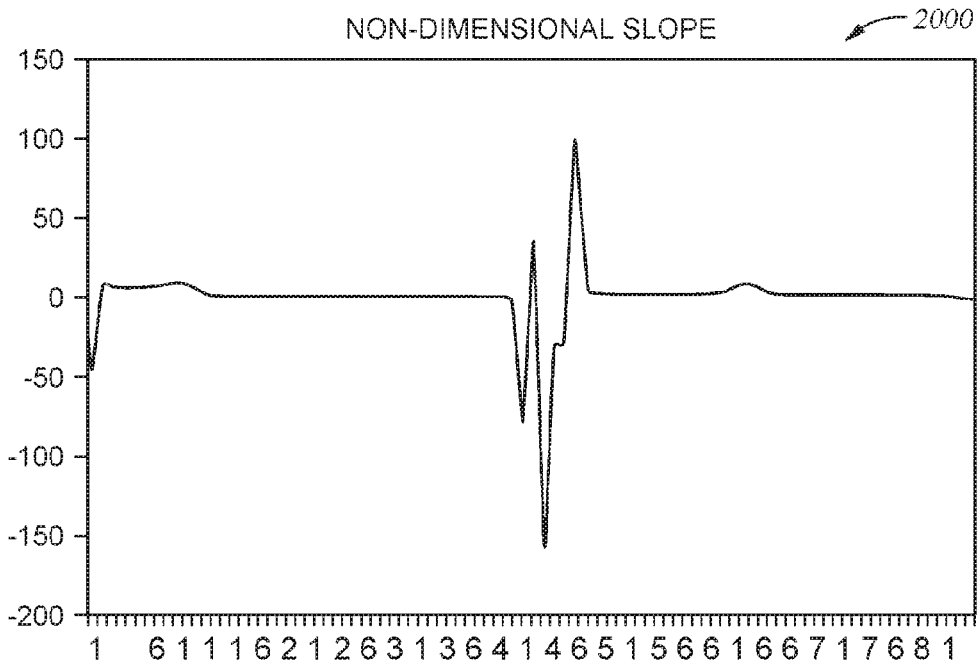
FIG. 20 is an example graph of the non-dimensional slope values obtained from the downhole card illustrated in FIG. 19 using the Method of Slopes, in accordance with certain aspects of the present disclosure.
Figure 21:
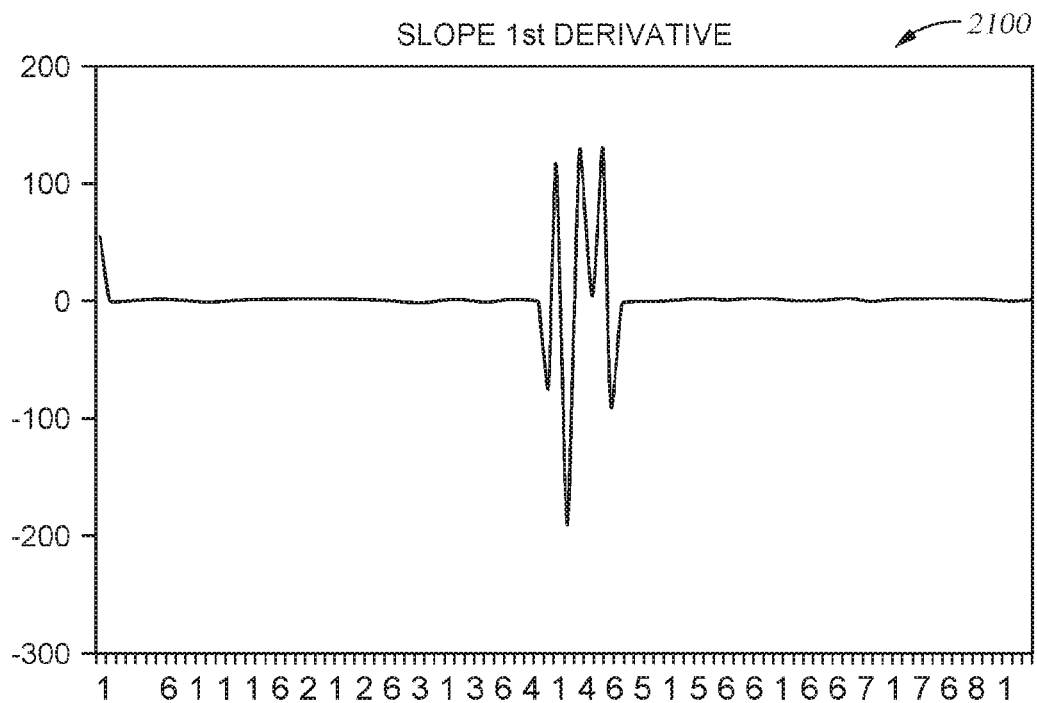
FIG. 21 is an example graph of a first derivative of the non-dimensional slope values of the downhole data shown in FIG. 20, in accordance with certain aspects of the present disclosure.
Figure 22:
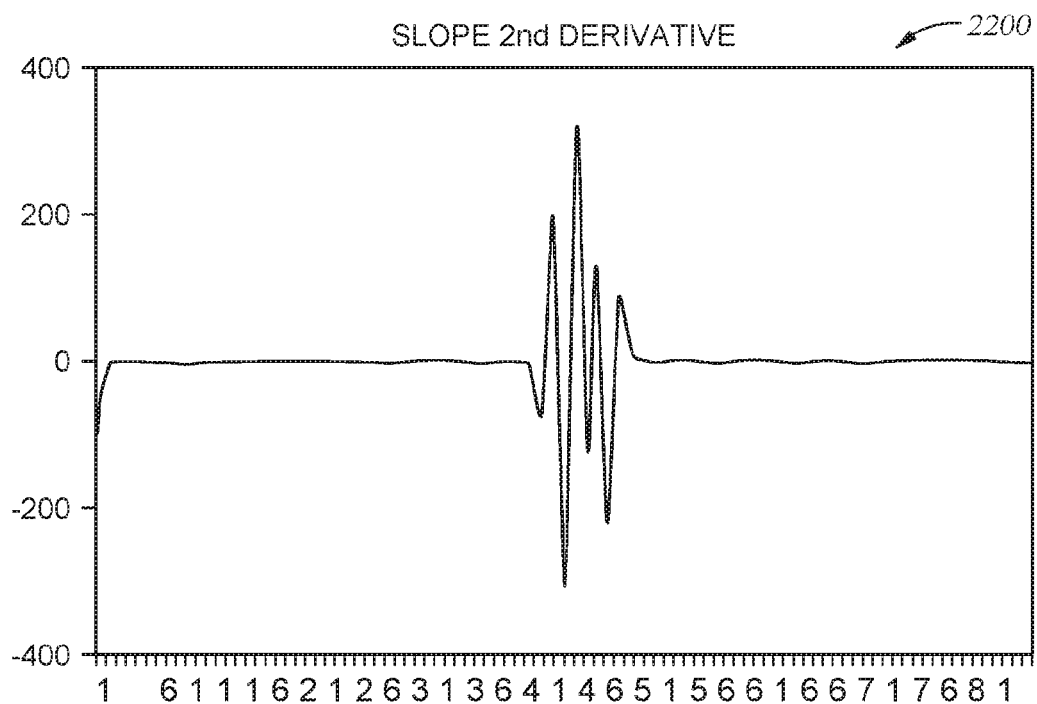
FIG. 22 is an example graph of a second derivative of the non-dimensional slope values of the downhole data shown in FIG. 20, in accordance with certain aspects of the present disclosure.

FIG. 20 is an example graph 2000 of the non-dimensional slope values obtained from the downhole card 1900 illustrated in FIG. 19, in accordance with certain aspects of the present disclosure. The graph 1900 may be obtained by applying the above equation (Eq. 1) to determine the non-dimensional slope between points of the downhole data that was used to generate the downhole card shown in FIG. 19. First and second derivatives of the non-dimensional slope values may be computed. FIGS. 21 and 22 illustrate graphs 2100 and 2200 showing the resulting curves for the first and second derivatives, respectively. In the graphs 2000-2200, the x-axis may correspond to non-dimensional position and the y-axis may correspond to non-dimensional load.

According to certain aspects, the non-dimensional slope vector as well as its first and second derivatives may be used to determine (e.g., infer) the standing valve opening, standing valve closing, transfer point, traveling valve opening, and/or pump fillage. For example, the determinations may be based on minima or maxima of the graphs 2000-2200.

Using the method of slopes technique provides for determining values which have not been previously determined, namely, the standing valve opening, standing valve closing, and traveling valve opening values. Knowing these parameters may be useful in many scenarios. One use for these values, described below, is for determining friction present in the system. Knowing the friction present may lead to better control in deviated wells.

Example Cardslice Pattern Matching

Figure 23:
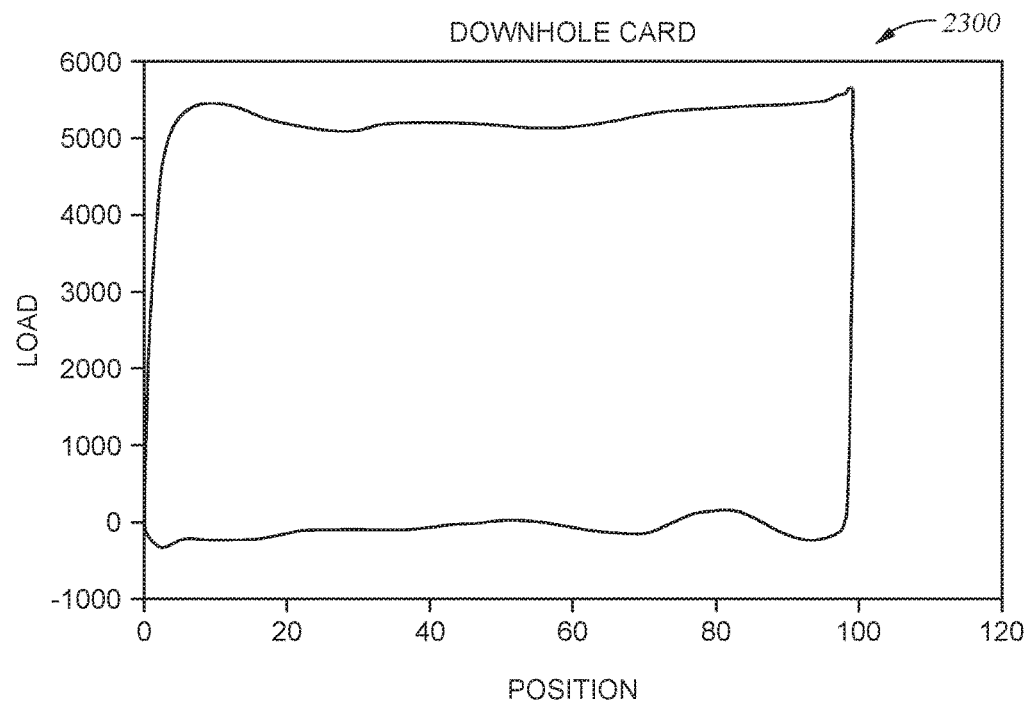
FIG. 23 is a graph illustrating another example downhole card computed from downhole data, in accordance with certain aspects of the present disclosure.
Figure 24:
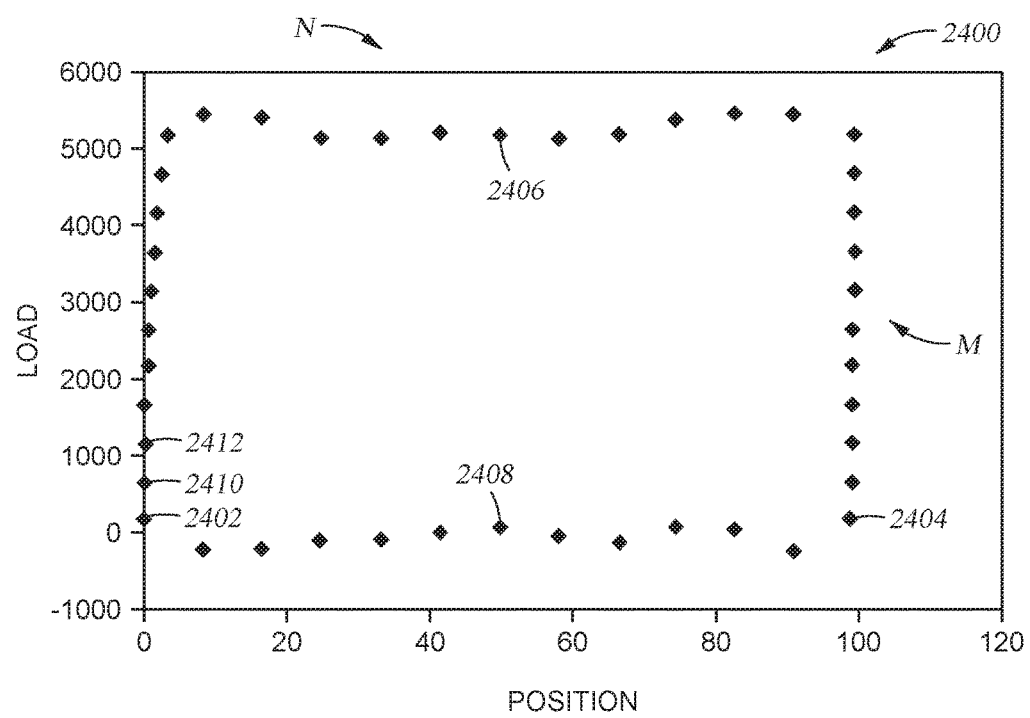
FIG. 24 is a graph illustrating the example downhole card shown in FIG. 23 segmented into finite points, in accordance with certain aspects of the present disclosure.

FIG. 23 is a graph illustrating another example graph 2300 of the downhole card computed from downhole data, in accordance with certain aspects of the present disclosure. According to certain aspects, the graph 2300 of the downhole card may be segmented into N finite increments (e.g., points) both vertically and horizontally (i.e., position and load) as shown in FIG. 24. Although in FIG. 24, there are 12 finite increments, any desired value for N can be chosen. In the graphs 2300 and 2400 of the downhole cards, the x-axis corresponds to position, and the y-axis corresponds to load.

Non-dimensional points corresponding to the position and load increments are collected on both the upstroke and downstroke. According to certain aspects, non-dimensional position spans and non-dimensional load spans are then computed from the points. Position span may correspond to the difference in position values between points having the same load value. For example, as shown in FIG. 24, the point 2402 on the upstroke may have a position value (e.g., 0) and a corresponding load value (e.g., 0), and the point 2404 on the downstroke having the same load value (e.g., 0) but a different position value (e.g., 100). Thus, the position span may be taken between these two points by computing the difference in the position values of the points 2402 and 2404. A position span can be computed for every other pair of data points having the same load value. Similarly, a load span may correspond to the difference in load values between points having the same position value. For example, as shown in FIG. 24, the point 2406 on the upstroke may have a position value (e.g., 50) and a corresponding load value (e.g., 5000), and the point 2408 on the downstroke having the same position value (e.g., 50) but a different load value (e.g., 0). Thus, the load span may be taken between these two points by computing the difference in the load values of the points 2406 and 2408. A load span can be computed for every other pair of data points having the same position value. This may create an array of non-dimensional position spans and an array of non-dimensional load spans.

Figures 25, 26:
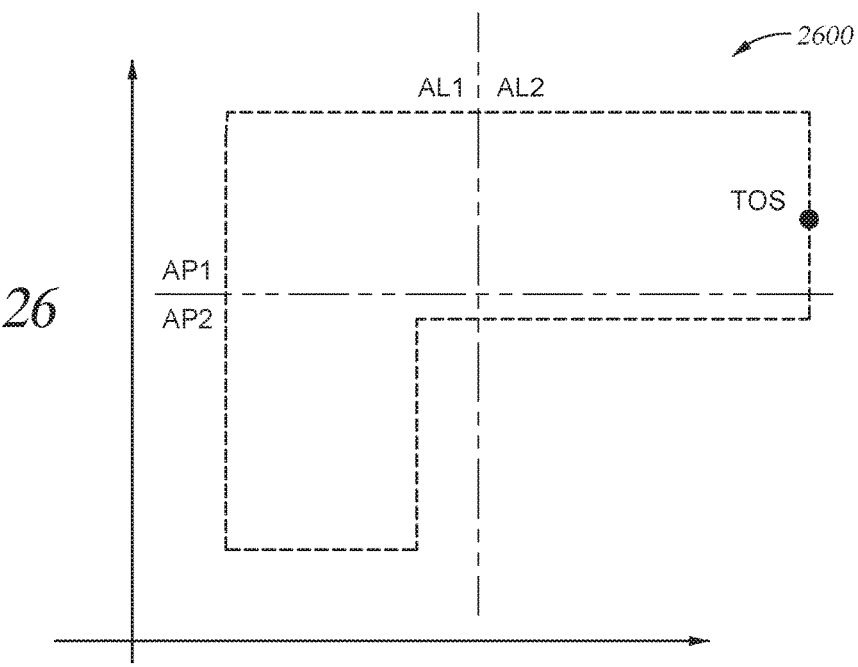
FIG. 25 is a table showing example non-dimensional position spans, non-dimensional load spans, and non-dimensional slope values computed for the finite points of the segmented downhole card in FIG. 24, in accordance with certain aspects of the present disclosure.
FIG. 26 is a graph showing an example downhole card divided into four sections for a 4-quadrant search, in accordance with certain aspects of the present disclosure.

Non-dimensional slope values may be computed between adjacent points to create four arrays of non-dimensional slope values: left, top, right, and bottom. For example, N−1 non-dimensional slope values may be computed for each pair of adjacent points shown on the left side of the graph 2400 in FIG. 24 to create the array of left non-dimensional slope values (e.g., between point 2402 and point 2410, between point 2410 and point 2412, and so on). The same can be done for the points on the top side of the graph 2400 in FIG. 24 to create the array of top non-dimensional slope values, for the points on the right side of the graph in FIG. 24 to create the array of right non-dimensional slope values, and for the points on the bottom side of the graph in FIG. 24 to create the array of bottom non-dimensional slope values. Table 2500 illustrated in FIG. 25 shows example arrays of position spans, load spans, and non-dimensional slope values for the graph 2400 of the segmented downhole card shown in FIG. 24. According to certain aspects, the position spans, load spans, and non-dimensional slope values can be analyzed to identify, for example, dynamometer card shape patterns and pump fillage conditions of the well. In certain aspects, the position spans, load spans, and non-dimensional slope values can be used in control algorithms for the well.

According to certain aspects, the position spans and loads spans may be compared in two algorithms (e.g., section search algorithms) depending on the position of the top of stroke: a 4-quadrant search algorithm (e.g., a first section search algorithm) or a 9-section search algorithm (e.g., a second section search algorithm). For example, for the 4-quadrant search algorithm, the position data may be divided into two sections: an upper position section (e.g., average position 1 (AP1)) and a lower position section (e.g., average position 2 (AP2)). Similarly, the load data may be divided into two sections: a left load section (e.g., average load 1 (AL1)) and a right load section (e.g., average load 2 (AL2)). The upper position section, lower position section, left load section, and right load section form 4 sections, or quadrants. FIG. 26 is a graph 2600 showing an example downhole card divided into four sections for a section search, in accordance with certain aspects of the present disclosure. As shown in the graph 2600, the four sections may be defined by an upper left quadrant (the intersection of AP1 and AL1), a lower left quadrant (the intersection of AP2 and AL1), an upper right quadrant (the intersection of AP1 and AL2), and a lower right quadrant (the intersection of AP2 and AL2).

Figure 27:
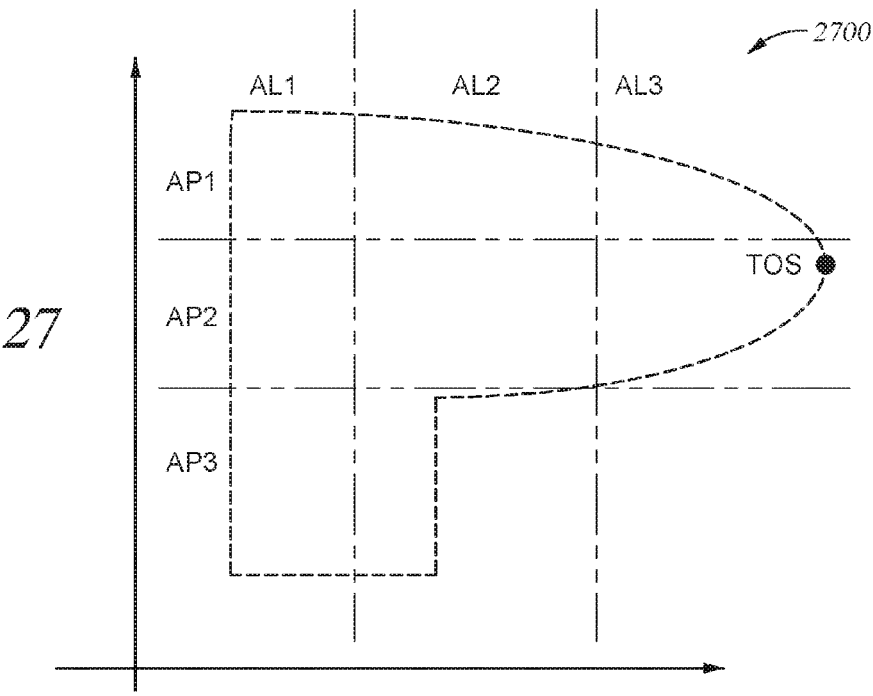
FIG. 27 is a graph showing an example downhole card divided into nine sections for a section search, in accordance with certain aspects of the present disclosure.

For the 9-section search algorithm (e.g., a second section search algorithm), the position data may be divided into three sections: a top position section (e.g., average position 1), a middle position section (e.g., average position 2), and a bottom position section (e.g., average position 3 (AP3)). Similarly, the load data may be divided into three sections: a left load section (e.g., average load 1), a middle load section (e.g., average load 2), and a right load section (e.g., average load 3 (AL3)). The top position section, middle position section, bottom position section, left load section, middle load section, and right load sections form the nine sections. FIG. 27 is a graph 2700 showing an example downhole card divided into nine sections for a section search, in accordance with certain aspects of the present disclosure. As shown in graph 2700, the nine sections may be defined by an upper position section (AP1), a middle position section (AP2), a lower position section (AP3), a left load section (AL1), a middle load section (AL2), and a right load section (AL3).

Based on the section search, the downhole data may be sorted into a particular dynamometer card shape pattern. For example, the card shape may indicate a full card or a pumped off scenario. Additionally or alternatively, the card shape may indicate that leakage (e.g., due to pump wear such as upstroke pump wear or downstroke pump wear), gas interference, high viscosity, tagging up or tagging down, or friction (e.g., mechanical, fluid) is present in the system. Additionally or alternatively, the card shape may indicate unanchored tubing, worn or split barrel, delayed traveling wave closure, standing valve stuck open, rods parted, tubing blown dry, traveling valve stuck open, or other conditions of the pump system After the downhole data have been sorted with a section search, a confirmation of the card shape, or second pattern matching/identification, can be performed. For example, a second pattern identification is done by comparing the non-dimension slope values as well as the position of a finite number of key points with respect to the position and load spans. The second pattern can be compared to the first pattern to confirm the dynamometer card shape pattern.

According to certain aspects, segmenting the downhole card (data) into finite increments can be used to determine a dynamometer card shape pattern for identifying pump fillage conditions. In combination with the card segmenting and pattern matching methods, the method of slopes can be used to determine the standing valve opening, standing valve closing, and/or traveling valve opening values, for a detailed analysis. For example, it may be possible to identify not only the downhole condition indicated by the dynamometer card shape pattern, but also where (e.g., in which rod part) the condition exists. This detailed analysis may be useful for pump control. In one illustrative example, if the second derivative of the non-dimensional slope indicates that the valve is closed and if the section search identifies a card shape that indicates that leakage is present, then it may be determined that corrective action to the system is advisable.

According to certain aspects, to determine the amount of friction present, the finite points may be interpolated (e.g., using cubic spline interpolation) and compared to the line formed by the standing valve opening point and the standing valve closing point, for example, as computed with the method of slopes described above. For example, the interpolation of the points may provide a function which may be compared to the line formed by the two points and a least squares technique may be used to see how the interpolated points differ from the line.

Figure 28:
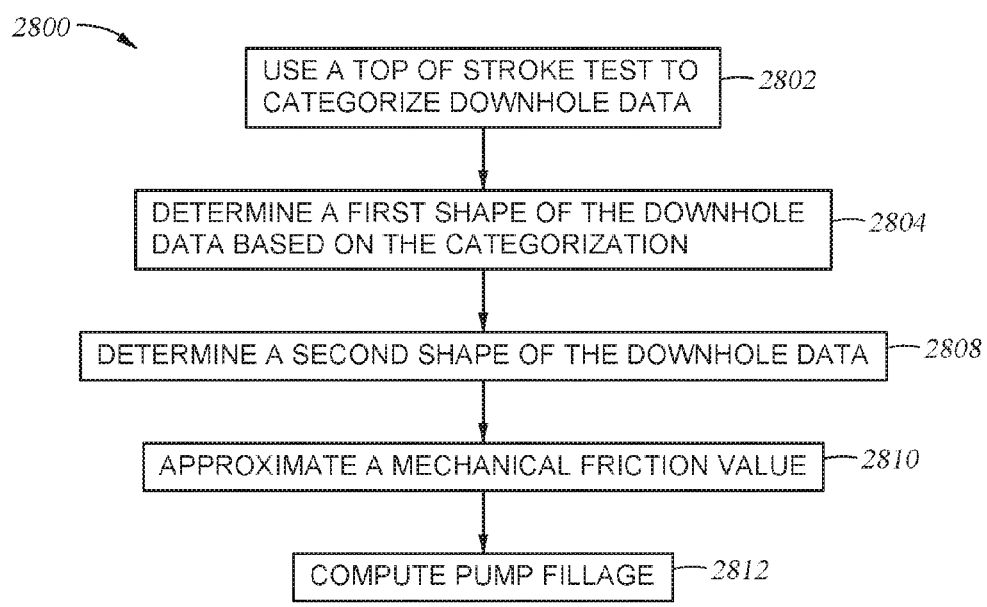
FIG. 28 is a flow chart illustrating example operations for cardslice and pattern matching, in accordance with certain aspects of the present disclosure.
Figure 29:
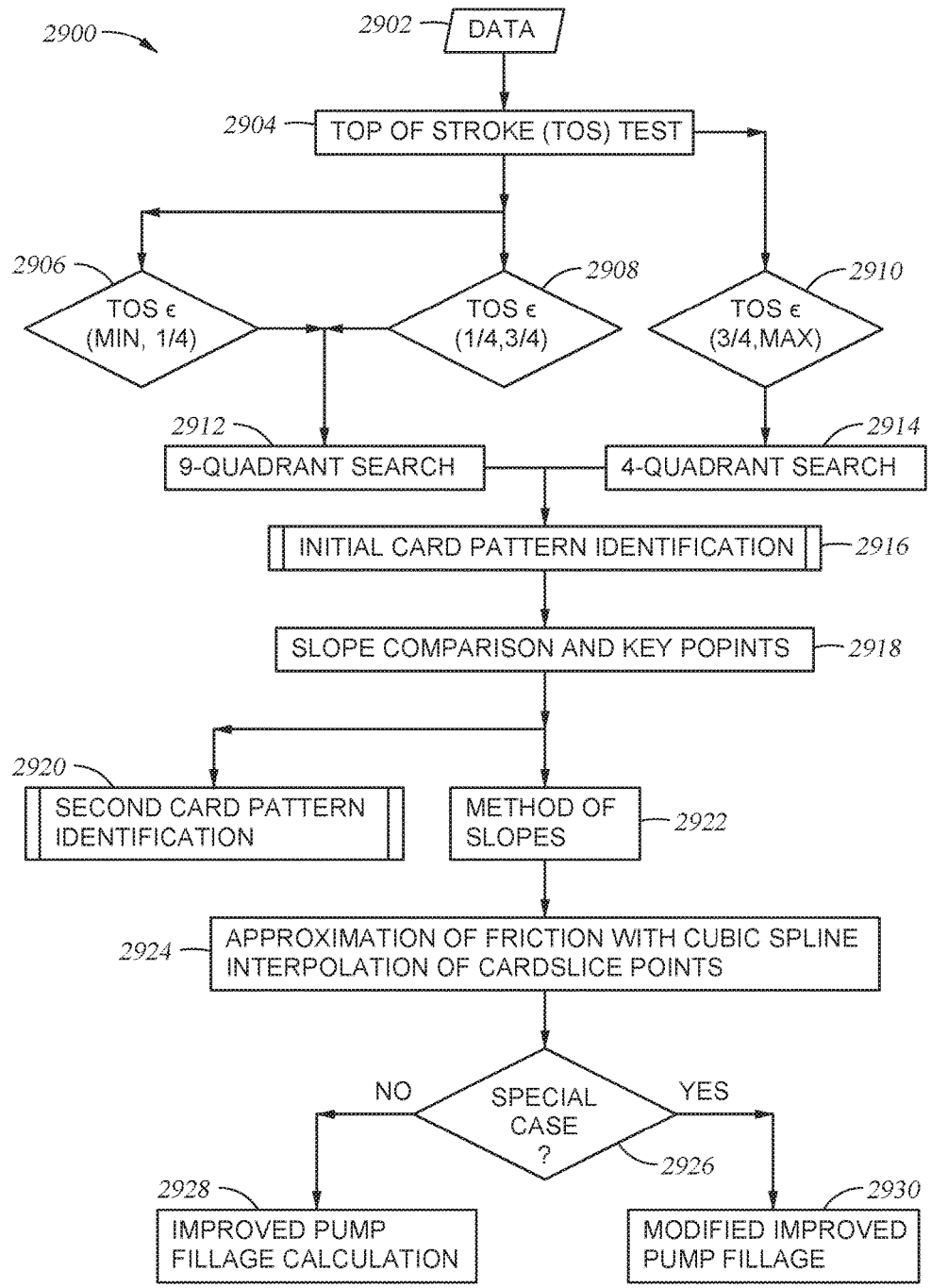
FIG. 29 is a flow diagram for determining pump fillage, in accordance with certain aspects of the present disclosure.

FIG. 28 is a flow chart illustrating example operations 2800 for cardslice and pattern matching, in accordance with certain aspects of the present disclosure and FIG. 29 is a more detailed flow diagram 2900 of the cardslice and pattern matching techniques described above, in accordance with certain aspects of the present disclosure.

The operations 2800 may be performed by a processor (e.g., control unit 110). The operations 2800 may include, at 2802, using a top of stroke test to categorize downhole data (e.g., as bottom quarter, top quarter, middle). As shown in FIG. 29, the top of stroke test performed at 2904 may include receiving data measured (e.g., measured using one or more sensors) or calculated at 292, such as rod displacement and rod load data for the sucker rod string (e.g., rod string 118). The top of stroke (TOS) can be located by finding the critical point of the downhole position data (e.g., finding the point where the first derivative of the downhole position data intersects the x-axis). The downhole data may be categorized based on whether the top of stroke point occurs between the load data minimum to ¼ section (e.g., bottom) at 2906, between the ¼ to ¾ section (e.g., middle) at 2908, or in the ¾ to load data maximum section (e.g., top) at 2910.

The operations 2800 may include, at 2802, determining a first (e.g., initial) dynamometer card shape pattern associated with the downhole data based on the categorization of the downhole data. As shown in FIG. 29, the determination may include performing a section search. The section search algorithm used may depend on the determination of the TOS test performed at 2904. For example, if TOS is determine to be at the bottom 2906 or middle 2908, a 9-section search may be performed at 2912. However, if the TOS is determine to be at the top 2910, a 4-quadrant search may be performed at 2914. Based on the section search, an initial dynamometer card shape pattern (e.g., 1 of 16 available or known shapes) for the data may be identified using pattern matching at 2916. The identified card shape corresponding to a particular scenario or pump fillage condition of the pumping system (e.g., artificial lift system 100).

The operations 2800 may include, at 2806, determining a second dynamometer card shape pattern of the downhole data. As shown in FIG. 29, the second dynamometer card shape pattern identification at 2920 may include comparing the slopes and position of one or more selected points (e.g., key points) with respect to the position span and the load span at 2918, for example, to confirm the first shape.

The operations 2800 may include, at 2808, approximating a friction value. As shown in the FIG. 29, the approximation of friction step at 2924 may include using the method of slopes at 2922 to determine standing valve opening and standing valve closing values. The approximation of friction step at 2924 may also include using the method of segmenting the downhole card and interpolating (e.g., using cubic splines) the points to form a function. The interpolated data (i.e., the function) may be compared to the line formed between the standing valve opening and standing valve closing points to approximate friction (e.g., using a least squares technique).

The operations 2800 may include, at 2810, computing pump fillage. As shown in FIG. 29, the pump fillage calculation used may depend on whether a special case applies. The determination of the special case at 2926 may be based on the friction approximation, for example, whether the amount of friction in the system exceeds a threshold. If the special case does not apply, pump fillage may be computed using an improved pump fillage calculation at 2928. The improved pump fillage calculation may account for method of slopes and the segmented downhole card and pattern matching. Alternatively, if a special case applies, pump fillage may be computed using a modified improved pump fillage calculation (e.g., using different points than the improved pump fillage calculation) at 2920. The modified improved pump fillage calculation may be based on the values computed using the method of slopes and may account for the determined friction. For example, the pump fillage calculation may be performed, at least in part, according to techniques disclosed in Ehimeakhe, V.: "Calculating Pump Fillage for Well Control using Transfer Point Location", SPE Eastern Regional Meeting, 12-14 Oct. 2010, Morgantown, W. Va., USA and U.S. Pat. No. 8,322,995, filed Mar. 8, 2010 entitled "CALCULATION OF DOWN- HOLE PUMP FILLAGE AND CONTROL OF PUMP BASED ON SAID FILLAGE", both of which are incorporated herein by reference in their entirety.

Figure 30:
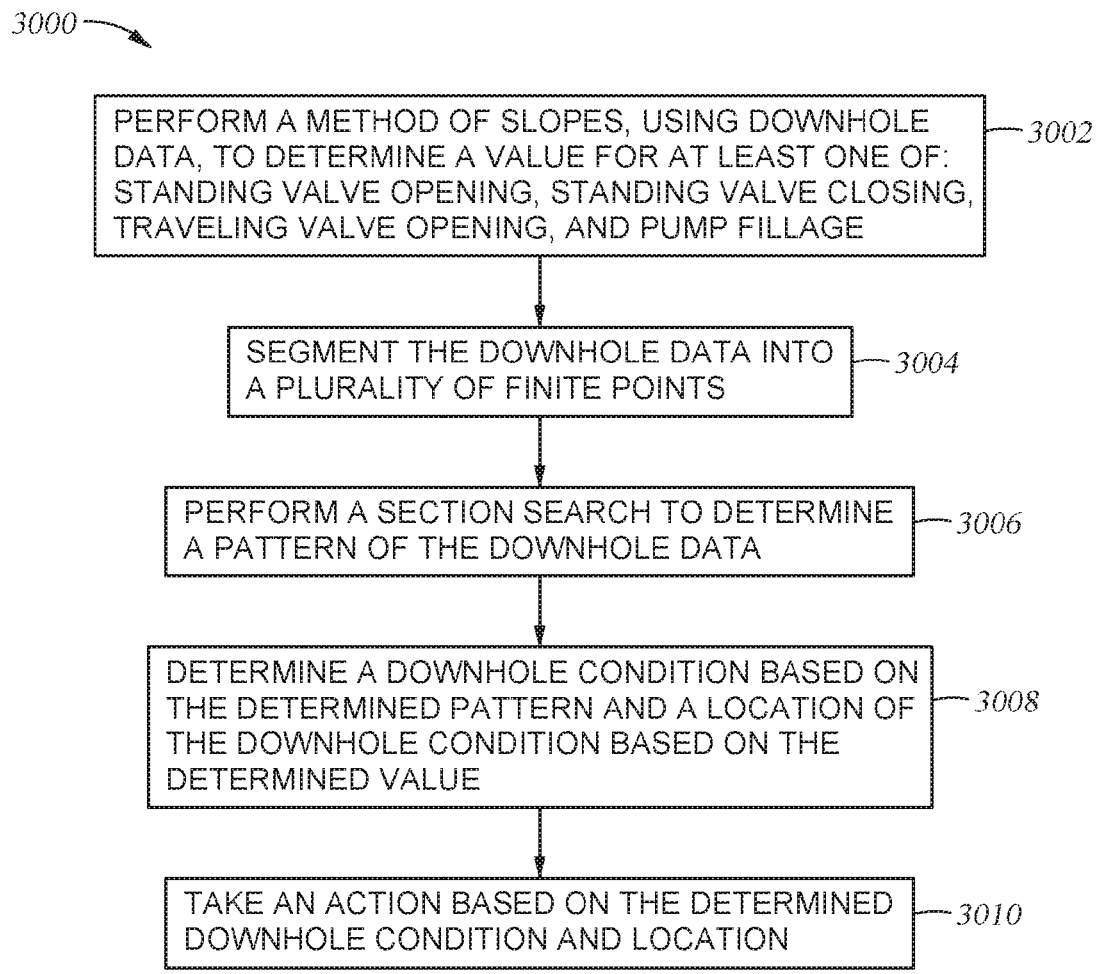
FIG. 30 is a flow chart illustrating example operations for determining a downhole condition and location, in accordance with certain aspects of the present disclosure.

FIG. 30 is a flow chart illustrating example operations 3000 for determining a downhole condition and location, in accordance with certain aspects of the present disclosure. The operations 3000 may be performed by a processor (e.g., control unit 110). The operations 3000 may include, at 3002, performing a method of slopes, using downhole data, to determine a value for at least one of standing valve opening, standing valve closing, traveling valve opening, and pump fillage. At 3004, the downhole data may be segmented into a plurality of finite points. At 3006, a section search may be performed (e.g., based on the TOS test) to determine a pattern of the downhole data (e.g., which can be confirmed by a second pattern identification). At 3008, a downhole condition may be determined based on the determined pattern and a location of the downhole condition may be determined based on the determined value. At 3010, an action may be taken based on the determine downhole condition and the location. For example, the information may be provided as feedback to control the well, the information may be provided to an operator, a recommendation may be made based on the information and the recommendation may be provided to the operator, the information may be provided as input for a model of the well and/or pump, etc.

Example Method of Extremities

Figure 31:
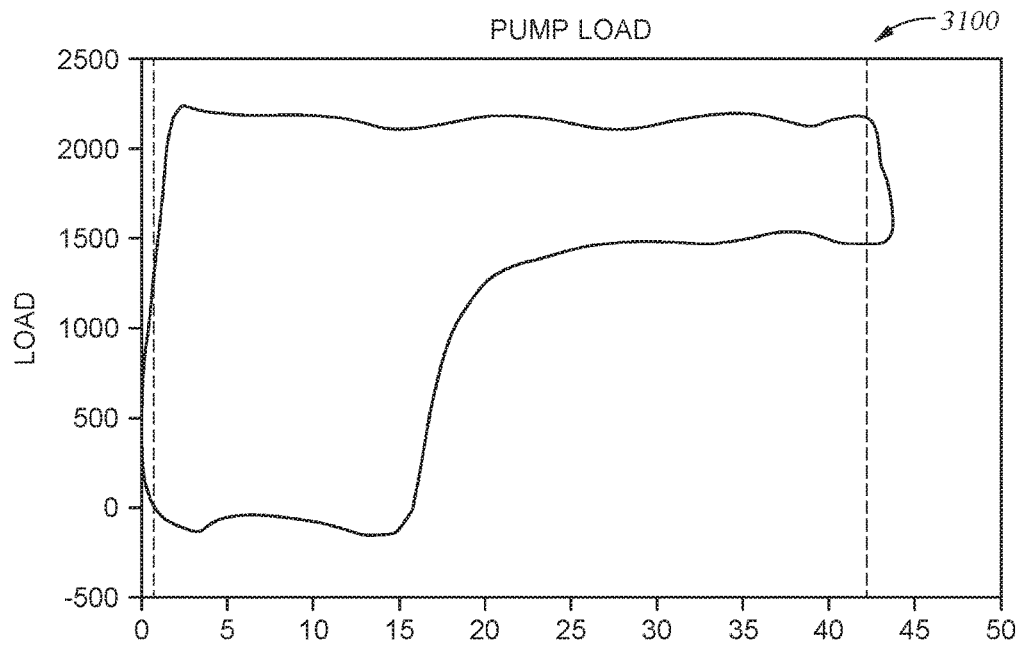
FIG. 31 is a graph illustrating an example downhole card, in accordance with certain aspects of the present disclosure.

According to certain aspects, a Method of Extremities can be used to aid in the pump fillage and pattern identification of the cardslice and pattern matching algorithm described above. The Method of Extremities may involve considering the end behavior of the downhole card, in both the load axis (e.g., y-axis) and the position axis (e.g., x-axis). For example, for position, points of the downhole data which are within a certain range may be discarded or ignored. In one example, the range may between 3% and 97% of the maximum position span, as shown in FIG. 31, although other ranges may be used. Thus, only the data points which are in the less than 3% or greater than 97% of the maximum position span may be analyzed.

Figure 32:
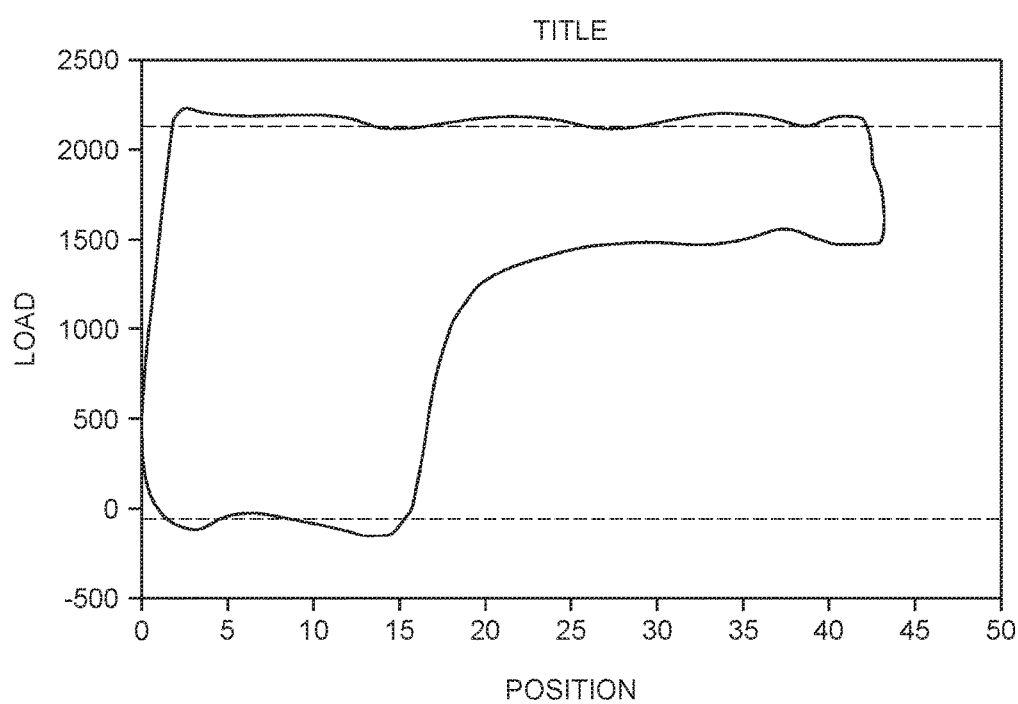
FIG. 32 is a graph illustrating an example downhole card, in accordance with certain aspects of the present disclosure.

Similarly, for load, points of the downhole data which are within a certain range (which may be a different range than the range used for the position) may be discarded or ignored. In one example, the range may between 5% and 95% of the maximum load span, as shown in FIG. 32, although other ranges may be used. Thus, only the data points which are in the less than 5% or greater 95% of the maximum load span may be analyzed.

According to certain aspects, the range and position of the resulting downhole points may be analyzed to help identify the dynamometer card shape pattern.

Example Standard Deviation Method

As mentioned above, the cardslice algorithm may include calculated non-dimensional slope values for points on the left, right, top, and bottom of the segmented card, as well as position spans, and load spans. According to certain aspects, this information may be statistically analyzed. For example, the information can be analyzed to infer mode, minimum and maximum values, average values, and/or standard deviations. For example, the standard deviation may be computed according to the following equation:

$$\sigma_x = \sqrt{\frac{\sum_1^N (x-\mu)^2}{N}} \quad \text{(Eq. 2)}$$

where σ is the standard deviation, μ is the mean, and N is the number of data values.

According to certain aspects, the results of the standard deviation computations can be applied to the subsets of data to guide the pump fillage calculation and pattern matching algorithm.

Example Methodology

Figure 33:
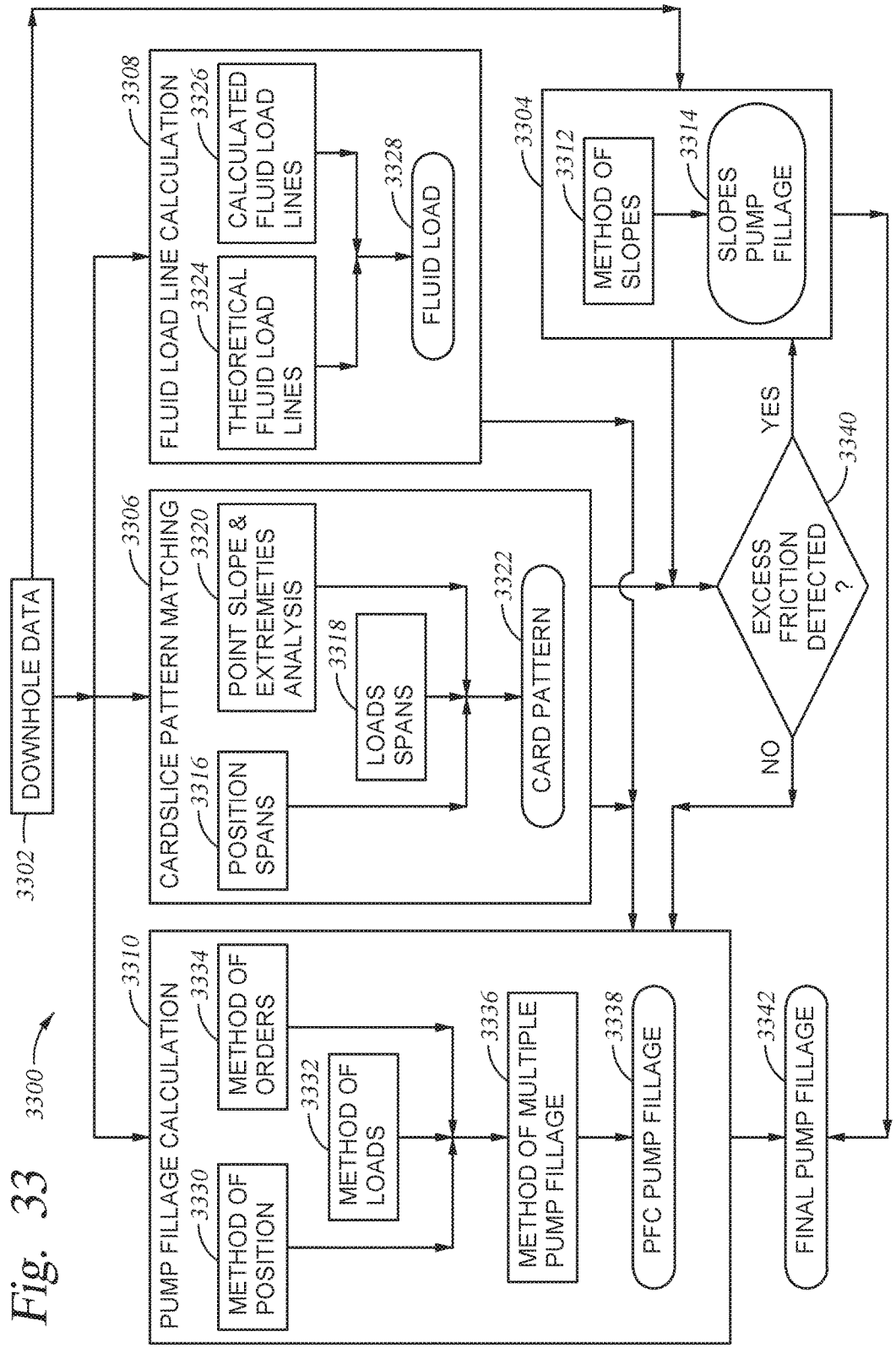
FIG. 33 is a flow diagram for determining pump fillage, in accordance with certain aspects of the present disclosure.

FIG. 33 is a flow diagram 3300 for determining pump fillage, in accordance with certain aspects of the present disclosure. As shown in FIG. 33, at 3302 downhole data may be obtained (e.g., measured or calculated). Using the downhole data, the method of slopes algorithm can be performed at 3304, the cardslice pattern matching algorithm can be performed at 3306, the fluid load line calculation algorithm can be performed at 3308, and the pump fillage calculation algorithm can be performed at 3310.

The method of slopes algorithm may include performing the method of slopes technique at 3312 as described above with respect to FIGS. 19-22 to determine pump fillage based on non-dimensional slope values at 3314. The cardslice pattern matching algorithm may be performed as described above with respect to FIGS. 23-32 to determine position spans at 3316, determine load spans at 3318, and determine point slopes and perform the method of extremities algorithm at 3320, which may be used to determine a dynamometer card shape pattern at 3322. The fluid load line calculation algorithm at 3308 may include a theoretical fluid load line calculation at 3324 and a calculated fluid load line at 3326 to determine the fluid load at 3328. The pump fillage calculation at 3310 may use the card pattern determined at 3322 and the fluid load calculated at 3328. The pump fillage calculation algorithm may be based on the method of position at 3330 as described above with respect to FIGS. 6-7B, the method of loads at 3332 as described above with respect to FIGS. 11-12, and/or the method of orders at 3334 as described above with respect to FIGS. 13-14. The method of position, method of loads, and method of orders may be used in the method of multiple pump fillage at 3336 as described above with respect to FIGS. 16-18 to determine the pump fillage at 3338.

As shown in FIG. 33, based on the results of the method of slopes algorithm at 3304 and the cardslice pattern matching algorithm at 3306, an amount of friction can be determined at 3340 and whether the friction exceeds a threshold. If there is excess friction in the system (e.g., exceeds the threshold), then the final pump fillage calculation at 3342 may be based on the pump fillage calculated using the method of slopes at 3314. Alternatively, if there is not excess friction in the system (e.g., does not exceed the threshold), then the final pump fillage calculation at 3340 may be based on the pump fillage calculation 3338 performed using cardslice pattern matching and fluid load line calculations.

Figure 34:
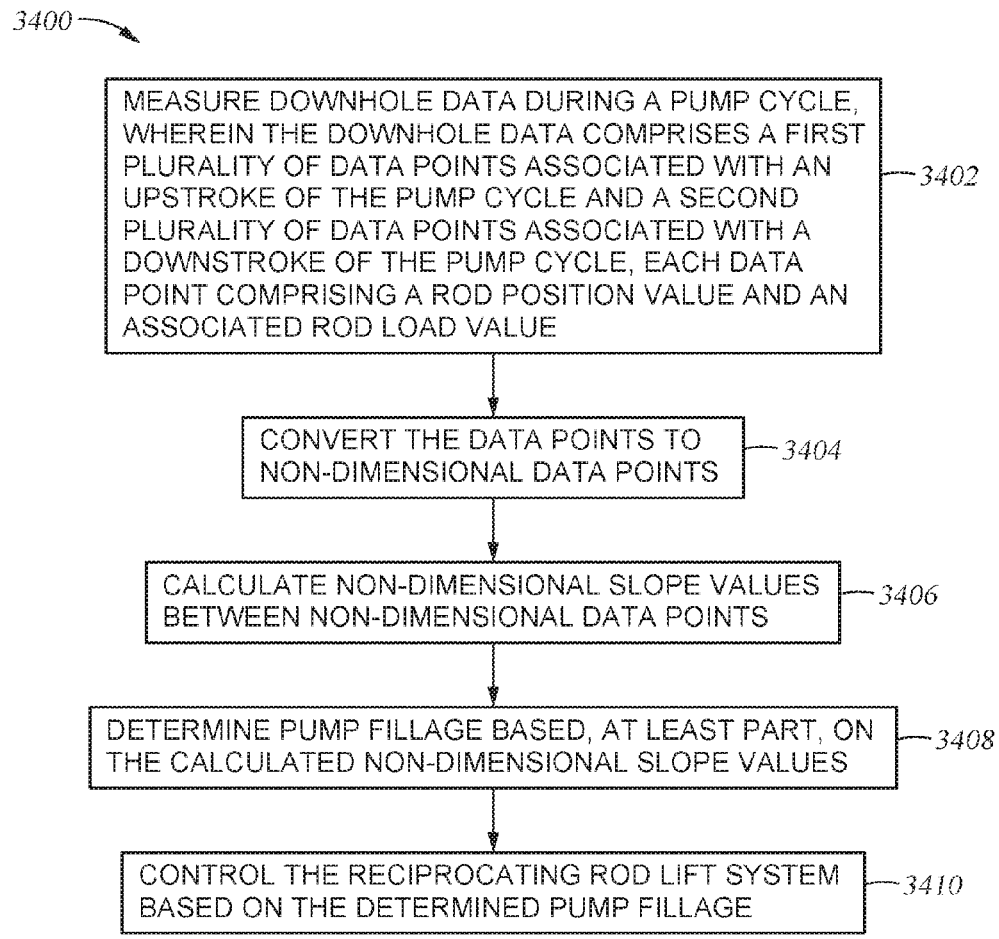
FIG. 34 is a flow chart illustrating example operations for determining pump fillage, in accordance with certain aspects of the present disclosure.

FIG. 34 is a flow chart illustrating example operations 3400 for determining pump fillage for a reciprocating rod lift system, in accordance with certain aspects of the present disclosure. The operations 3400 may be performed by a processor (e.g., control unit 110). The operations 3400 may begin, at 3402, by measuring downhole data during a pump cycle, wherein the downhole data comprises a first plurality of data points associated with an upstroke of the pump cycle and a second plurality of data points associated with a downstroke of the pump cycle, each data point comprising a rod position value and an associated rod load value.

At 3404, the data points are converted to non-dimensional data points (e.g., by dividing the rod position value by a maximum rod position span and dividing the rod load value by a maximum rod load span).

At 3406, non-dimensional slope values are calculated (e.g., using Eq. 1) between non-dimensional data points. According to certain aspects, the non-dimensional slope values can be calculated according the method of slopes by calculating the non-dimensional slope values between each pair of adjacent non-dimensional data points. Maxima and minima of first and second derivatives of the non-dimensional slope values can be used to determine at least one parameter of the reciprocating rod lift system (e.g., a standing valve opening point, a standing valve closing point, a traveling valve opening point, a traveling valve closing point, and a transfer point). According to certain aspects, the non-dimensional slope values can be calculated according the cardslice algorithm by segmenting the downhole data into finite data points and calculating non-dimensional slope values between each pair of adjacent data points. The method of slopes and cardslice algorithm can be used independently to determine the pump fillage. The final pump fillage value used may be based on an amount of friction in the system. According to certain aspects, the cardslice pattern matching can be used to determine a downhole dynamometer card shape pattern associated with the downhole data to identify a condition associated with the reciprocating rod lift system, the at least one parameter obtained using the method of slopes algorithm can be used to identify a location of the condition in the reciprocating rod lift system.

At 3408, pump fillage is determined based, at least part, on the calculated non-dimensional slope values.

Optionally, at 3410, the reciprocating rod lift system can be controlled based on the determined pump fillage.

According to certain aspects, the operations 2800, 300, and 3400 may be performed by sensors for measuring data, a processor (e.g., in the control unit 110) for receiving measurements and performing determining, computing, calculating, testing, approximating, performing, segmenting, and taking action steps.

According to certain aspects, any and/or all of the sides (left, right, top, and bottom) of the determined shape (card pattern) may be used. According to certain aspects, the shape of the downhole data may be displayed, for example, at surface instrumentation. In addition, an amount of loss, for example, due to pump wear may be calculated using the techniques described herein. The loss may also be displayed at the surface instrumentation.

According to certain aspects, the results of the downhole diagnostic analysis techniques described above may be used to trigger appropriate warnings or notifications, for example, to an operator. For example, based on the analysis, conditions may be identified and reported, such as fluid pound, pump-off, gas interference, presence of friction (e.g., fluid, coulomb, or mechanical), pump wear (e.g., upstroke or downstroke), severity of pump wear, pump fillage, valve opening and closing, net stroke, high viscosity, tagging up or tagging down, unanchored tubing, worn or split barrel, delayed traveling wave closure, standing valve stuck open, rods parted, tubing blown dry, or traveling valve stuck open. However, these conditions are merely exemplary. In aspects, the techniques may be used to determine other downhole conditions. In aspects, the conditions may be reported, for example displayed, flagged, or notified to the operator by other means. In aspects, the conditions may be reported, additionally or alternatively, a recommendation based on the identified downhole conditions may be displayed or notified to the operator.

According to certain aspects, the results of the downhole diagnostic analysis techniques described above may be provided as feedback, for example, to a pump controller (e.g., control unit 110) for controlling/adjusting (e.g., automated) an operating parameter of the pumping system. In aspects, this may include controlling/adjusting stroke length, pump speed, or other operating parameters, for example, based on the feedback.

According to certain aspects, in addition or alternatively to reporting the identified downhole conditions or providing feedback to the pump controller (e.g., which are based on the results of the improved diagnostic techniques described herein), recommended changes to operating parameters may be provided the operator. The operator may choose to implement or ignore/override the recommended changes.

According to certain aspects, the results of the downhole diagnostic analysis techniques described above may be used as input for generating a model of the well and pumping unit. The model may be used, in one example, to explore potential effects of changing operating parameters.

It should be noted that the above described use cases are merely exemplary uses of the results of the downhole diagnostic analysis techniques described herein; the uses are not limited to these examples and could be used for additional purposes as well.

Using the above methodologies, it may be possible to more accurately perform pump fillage calculations. In addition, the techniques may provide for automated feedback regarding shape of the downhole data. For example, it may be possible to report presence of friction, gas interference, etc. Further, these techniques may allow loss to be more accurately determined and for recommendations to be made regarding system optimizations.

As used herein, the term "determining" encompasses a wide variety of actions. For example, "determining" may include calculating, computing, processing, deriving, and the like. As used herein, a phrase referring to "at least one of" a list of items refers to any combination of those items, including single members.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Any of the operations described above may be included as instructions in a computer-readable medium for execution by the control unit 110 or any other processing system. The computer-readable medium may comprise any suitable memory for storing instructions, such as read-only memory (ROM), random access memory (RAM), flash memory, an electrically erasable programmable ROM (EEPROM), a compact disc ROM (CD-ROM), or a floppy disk.

While the foregoing is directed to aspects of the present disclosure, other and further aspects of the disclosure may be devised without departing from the basic scope thereof, and the scope thereof is determined by the claims that follow.

The invention claimed is:

1. A method by a control unit for pump fillage determination for a reciprocating rod lift system, comprising:

measuring downhole data during a pump cycle, wherein the downhole data comprises a first plurality of data points associated with an upstroke of the pump cycle and a second plurality of data points associated with a downstroke of the pump cycle, each data point comprising a rod position value and an associated rod load value;

converting, by the control unit, the data points to non-dimensional data points;

calculating non-dimensional slope values between the non-dimensional data points;

determining pump fillage based, at least in part, on the calculated non-dimensional slope values; and controlling the reciprocating rod lift system based on the determined pump fillage.

2. The method of claim 1, wherein converting the data points to the non-dimensional data points comprises, for each data point:

dividing the rod position value by a maximum rod position span; and dividing the rod load value by a maximum rod load span.

3. The method of claim 1, wherein the calculating comprises:

subtracting a rod position value associated with a first data point from a rod position value associated with a second data point to obtain a position difference value;

subtracting a rod load value associated with the first data point from a rod load value associated with the second data point to obtain a load difference value; and dividing the load difference value by the position difference value to determine the slope between the first and second data points.

4. The method of claim 1, wherein the calculating comprises:

calculating the non-dimensional slope values between each pair of adjacent non-dimensional data points.

5. The method of claim 4, further comprising:

determining at least one parameter of the reciprocating rod lift system based on the calculated non-dimensional slope values, wherein the at least one parameter comprises at least one of: a standing valve opening point, a standing valve closing point, a traveling valve opening point, a traveling valve closing point, or a transfer point.

6. The method of claim 5, wherein determining the at least one parameter comprises:

taking a first or second derivative of the calculated non-dimensional slope values; and determining the at least one parameter based on a minima or maxima of a resulting curve of at least one of: the non-dimensional slope values, the first derivative, or the second derivative.

7. The method of claim 1, further comprising:

segmenting the downhole data with respect to rod load values into a first subset of data points; and segmenting the downhole data with respect to rod position values into a second subset of data points.

8. The method of claim 7, wherein the calculating comprises:

calculating non-dimensional slope values between each pair of adjacent data points in the first and second subsets of data points.

9. The method of claim 7, further comprising:

for each data point in the first subset of data points having a same rod load value as another data point in the first subset, determining a rod position span between those data points; and for each data point in the second subset of data points having a same rod position value as another data point in the second subset, determining a rod load span between those data points.

10. The method of claim 9, further comprising comparing the rod load spans and the rod position spans to perform a top of stroke (TOS) test involving a section search to identify a first dynamometer card shape pattern of the downhole data.

11. The method of claim 10, further comprising:

identifying a second dynamometer card shape pattern of the downhole data based on the calculated non-dimensional slope values; and comparing the first and second dynamometer card shape patterns to confirm the dynamometer card shape pattern.

12. The method of claim 7, further comprising:

interpolating the first and second subsets of data points to obtain an interpolated standing valve opening point and an interpolated standing valve closing point; and comparing the interpolated standing valve opening point and the interpolated standing valve closing point to a standing valve opening point and a standing valve closing point determined by a method of slopes, to obtain an amount of friction in the reciprocating rod lift system.

13. The method of claim 7, further comprising:

determining a minimum position value, a maximum position value, a minimum load value, and a maximum load value, wherein the first and second subsets of data points comprise only data points that are within a first threshold range of the minimum position value or the maximum position value and data points that are within a second threshold range of the minimum load value or the maximum load value.

14. The method of claim 7, further comprising:

determining at least one of: a mode value, a minimum value, a maximum value, an average value, or a standard deviation value for at least one of: a rod load span, a rod position span, or the calculated non-dimensional slope values; and using the at least one of: the mode value, the minimum value, the maximum value, the average value, or the standard deviation value for at least one of: determining the pump fillage or determining a dynamometer card shape pattern of the downhole data.

15. The method of claim 1, wherein the calculating the non-dimensional slope values comprises:

calculating a first plurality of non-dimensional slope values between each pair of adjacent non-dimensional data points according to a first algorithm;

determining at least one parameter of the reciprocating rod lift system according to the first algorithm; and calculating a second plurality of non-dimensional slope values for each pair of adjacent non-dimensional data points in subsets of the non-dimensional data points according to a second algorithm.

16. The method of claim 15, further comprising:

dynamically selecting between determining pump fillage based, at least in part, on the first algorithm, the second algorithm, or the first algorithm and the second algorithm.

17. The method of claim 16, wherein the selection is based on an amount of friction in the reciprocating rod lift system.

18. The method of claim 15, further comprising:
using at least one of: the first algorithm or the second algorithm to determine a downhole dynamometer card shape pattern associated with the downhole data to identify a condition associated with the reciprocating rod lift system; and
using the at least one parameter to identify a location of the condition in the reciprocating rod lift system.

19. A non-transitory computer readable medium having computer executable code stored thereon for pump fillage determination by a control unit for a reciprocating rod lift system, the computer executable code comprising:
code for measuring downhole data during a pump cycle, wherein the downhole data comprises a first plurality of data points associated with an upstroke of the pump cycle and a second plurality of data points associated with a downstroke of the pump cycle, each data point comprising a rod position value and an associated rod load value;
code for converting the data points to non-dimensional data points;
code for calculating non-dimensional slope values between the non-dimensional data points;
code for determining pump fillage based, at least in part, on the calculated non-dimensional slope values; and
code for controlling the reciprocating rod lift system based on the determined pump fillage.

20. The computer readable medium of claim 19, wherein:
the code for calculating comprises code for calculating the non-dimensional slope values between each pair of adjacent non-dimensional data points; and
the computer executable code further comprises code for determining at least one parameter of the reciprocating rod lift system based on the calculated non-dimensional slope values, wherein the at least one parameter comprises at least one of: a standing valve opening point, a standing valve closing point, a traveling valve opening point, a traveling valve closing point, or a transfer point.

21. The computer readable medium of claim 19, the computer executable code further comprising:
code for segmenting the downhole data with respect to rod load values into a first subset of data points; and
code for segmenting the downhole data with respect to rod position values into a second subset of data points, wherein the code for calculating comprises code for calculating non-dimensional slope values between each pair of adjacent data points in the first and second subsets of data points.

22. The computer readable medium of claim 21, the computer executable code further comprising:
code for determining a rod position span between those data points for each data point in the first subset of data points having a same rod load value as another data point in the first subset; and
code for determining a rod load span between those data points for each data point in the second subset of data points having a same rod position value as another data point in the second subset.

\* \* \* \* \*